US007076740B2

(12) United States Patent
Santori et al.

(10) Patent No.: US 7,076,740 B2
(45) Date of Patent: *Jul. 11, 2006

(54) SYSTEM AND METHOD FOR PERFORMING RAPID CONTROL PROTOTYPING USING A PLURALITY OF GRAPHICAL PROGRAMS THAT SHARE A SINGLE GRAPHICAL USER INTERFACE

(75) Inventors: Mike Santori, Austin, TX (US); John Limroth, Austin, TX (US)

(73) Assignee: National Instruments Corporation, Austin, TX (US)

( * ) Notice: Subject to any disclaimer, the term of this patent is extended or adjusted under 35 U.S.C. 154(b) by 427 days.

This patent is subject to a terminal disclaimer.

(21) Appl. No.: 10/046,868

(22) Filed: Jan. 15, 2002

(65) Prior Publication Data

US 2003/0132964 A1 Jul. 17, 2003

(51) Int. Cl.
*G09G 5/00* (2006.01)

(52) U.S. Cl. .................. 715/771; 715/772; 715/763; 715/970; 703/4

(58) Field of Classification Search ............... 715/771, 715/772, 763, 970; 717/1, 3, 11; 703/2, 703/22, 4, 14
See application file for complete search history.

(56) References Cited

U.S. PATENT DOCUMENTS

| 6,053,951 A | * | 4/2000 | McDonald et al. ......... 717/109 |
| 6,064,409 A | * | 5/2000 | Thomsen et al. ........... 345/700 |
| 6,138,270 A | * | 10/2000 | Hsu ........................... 717/125 |
| 6,173,438 B1 | | 1/2001 | Kodosky et al. |
| 6,219,628 B1 | * | 4/2001 | Kodosky et al. ................ 703/2 |
| 2001/0024211 A1 | * | 9/2001 | Kudukoli et al. ........... 345/763 |
| 2001/0034881 A1 | * | 10/2001 | Washington ................... 717/5 |

OTHER PUBLICATIONS

"Solutions for Control" Catalog 1999, dSPACE, Copyright 1998 dSPACE GmbH; pp. 1-168.
The Measurement and Automation Catalog 2001 National Instruments Corporation, Copyright 2000, pp. 100 and 101.
"Dynamic System Simulation for MATLAB" Using Simulink, Version 4, Copyright 1990-2000 by The MathWorks, Inc., pp. 1-2 through 3-28.

* cited by examiner

*Primary Examiner*—Ba Huynh
(74) *Attorney, Agent, or Firm*—Meyertons Hood Kivlin Kowert & Goetzel, P.C.; Jeffrey C. Hood; Jason L. Burgess

(57) ABSTRACT

A system and method for performing rapid control prototyping using a plurality of graphical programs that share a single graphical user interface. A first graphical program may be created that models a product being designed. The first graphical program may be deployed on a target device for execution. A second graphical program that performs a measurement function may be created. The target device may be coupled to a physical system. The first graphical program may be executed on the target device to simulate operation of the product. The second graphical program may be executed to measure characteristics of the operation of the physical system and/or characteristics of the operation of the product. A single graphical user interface comprising a first one or more graphical user interface elements for the first graphical program and a second one or more graphical user interface elements for the second graphical program may be displayed.

67 Claims, 15 Drawing Sheets

SYSTEM AND METHOD FOR PERFORMING RAPID CONTROL PROTOTYPING USING A PLURALITY OF GRAPHICAL PROGRAMS THAT SHARE A SINGLE GRAPHICAL USER INTERFACE

FIELD OF THE INVENTION

The present invention relates to the field of graphical programming. In particular, the invention relates to a system and method for performing rapid control prototyping using a plurality of graphical programs that share a single graphical user interface.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for measuring, controlling, or modeling devices, such as instruments, processes or industrial automation hardware, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

It is often necessary or desirable to implement an application or develop a solution using two or more separate graphical programs. The separate graphical programs can be designed to work together to accomplish the desired functionality. Having separate graphical programs may be advantageous for various reasons. For example, separating functionality of the application into different graphical programs may help to increase the modularity of the application. Also, in a distributed application, the separate graphical programs may execute on different computer systems.

In many cases, it would be desirable for the separate graphical programs to be able to share a single graphical user interface. In this way, program output from each of the graphical programs could be displayed on the single graphical user interface, so that the application appears to the user as a single integrated application. However, in general, prior art systems do not provide the capability for separate graphical programs to share the same graphical user interface. It would thus be desirable to provide this capability.

Many different graphical program development environment applications are in use today, including LabVIEW, DasyLab, and Diadem from National Instruments, Simulink from The MathWorks, and VEE from Agilent, among many others. The process of developing a graphical program in various graphical program development environments is similar in many ways. For example, as described above, the user typically creates a block diagram including various interconnected nodes and/or programmatic structures. However, the programs developed in these various graphical program development environments may differ in many aspects. For example, the various nodes available for inclusion in a block diagram may differ from one environment to another. For example, different graphical program development environments may support different graphical programming "languages", such as the G language supported by LabVIEW. A graphical program developed using a particular graphical program development environment may be said to be "associated" with that graphical program development environment.

For any given task, one particular graphical program development environment may be better suited than another to implement the task. For example, one graphical program development environment may be best suited for creating graphical programs for measurement or automation tasks, whereas a second graphical program development environment may be preferred for certain simulation or modeling tasks. As another example, one graphical program development environment may have more sophisticated or powerful GUI or front panel capabilities, and it may be desirable to include certain user interface elements from a second graphical program development environment. For an application implemented using separate graphical programs as described above, it would be desirable to enable program developers to develop each graphical program using the best-suited graphical program development environment and still have the graphical programs share a single graphical user interface.

SUMMARY OF THE INVENTION

One embodiment of the invention comprises a system and method for performing rapid control prototyping using a plurality of graphical programs that share a single graphical user interface. A goal of rapid control prototyping is to enable new product prototypes to be implemented and tested on real-time hardware, e.g., before the design of the product has been finalized and before the product has actually gone into production. For example, according to the rapid control prototyping process, a control algorithm can be developed and deployed on a target controller or target device. For example, the target device may include real-time hardware that can execute the control algorithm, e.g., on configurable hardware such as an FPGA or DSP. The target device may be chosen to have characteristics similar to what the production device will have, e.g., in characteristics such as CPU, memory, I/O, etc.

The target controller or device that executes the control algorithm under test may be coupled to a real physical system, i.e., the physical system that the production device will be used to control. Thus, the target device executing the control algorithm may behave much the same as if the production device were controlling the physical system. However, the process of deploying a control algorithm on the target device may be performed significantly easier and more quickly than if a production device were manufactured to test each version of a control algorithm under test. For example, the programming environment used to create the control algorithm may provide support for automatically deploying the algorithm on the target device. Thus, the design/test process may be a very tight closed loop, allowing designs to be quickly and easily tested and significantly speeding up the product development process.

In various applications, the target device may be coupled to and may control any of various types of physical systems. For example, if an electronic control unit for an automobile engine is being developed, the target device may be coupled to an actual engine, and possibly other components such as transmission, brakes, etc.

According to one embodiment of the method, a first graphical program may be created, wherein the first graphical program models a product being designed. For example, in the case of a control unit under design, the first graphical program may implement a control algorithm for the control unit. The first graphical program may be created in a first graphical program development environment. For example, it may be desirable to create the first graphical program using a first graphical program development environment specialized for creating simulation programs.

The first graphical program may be deployed on a target device for execution. In various embodiments, any of various types of target devices may be used to execute the first graphical program, and any of various methods may be used to deploy the first graphical program on the target device. The target device may comprise real-time configurable hardware operable to execute the first graphical program. In one embodiment, the target device may be a board comprised in a slot of a computer system, and deploying the first graphical program on the target device may comprise transferring the first graphical program from the computer system to the board. In another embodiment, the target device may be external to a computer system, e.g., may be housed separately from the computer system, and deploying the first graphical program on the target device may comprise transferring the first graphical program from the computer system to the external target device. As one example, the target device may be an external PXI chassis connected to the computer system.

A second graphical program may be created, wherein the second graphical program performs a measurement function. For example, the second graphical program may be designed to measure characteristics of the target device that executes the first graphical program. The second graphical program may be created in a second graphical program development environment. For example, it may be desirable to create the second graphical program using a second graphical program development environment specialized for creating measurement programs.

The target device may be coupled to a physical system. In various embodiments, the target device may be coupled to the physical system in any of various ways. For example, the target device may include various input/output ports that connect to input/output ports of the physical system. In some cases, intermediate devices may be connected between the target device and the physical system, such as actuators that control the system and/or sensors that provide feedback to the target device.

The first graphical program may be executed on the target device to simulate operation of the product. During this execution, the target device may interact with the physical system. For example, in the case of a first graphical program that implements a control algorithm, the target device may execute the control algorithm to control the physical system, as described above.

The second graphical program may be executed to measure characteristics of the operation of the product. This may comprise executing the second graphical program on a computer system coupled to the target device and/or on a computer system coupled to the physical system, wherein the second graphical program measures characteristics of the physical system and/or the target device executing the first graphical program. The second graphical program may be executed concurrently with, or at least partially concurrently with, execution of the first graphical program. The characteristics measured by the second graphical program may be useful in analyzing operation of the product being developed.

A single graphical user interface may be displayed, wherein the single graphical user interface comprises a first one or more graphical user interface elements for the first graphical program and a second one or more graphical user interface elements for the second graphical program. The single graphical user interface may be displayed in any of various locations, such as on a computer system that executes the second graphical program or on another computer system.

The single graphical user interface may have been previously created or defined in response to user input assembling the first one or more graphical user interface elements and the second one or more graphical user interface elements on a display. For example, the first one or more graphical user interface elements and the second one or more graphical user interface elements may be assembled on a single window of a display or on a single front panel in response to user input.

The first one or more graphical user interface elements for the first graphical program may include input and/or output GUI elements related to the operation of or the modeling performed by the first graphical program. For example, the first one or more graphical user interface elements may include GUI input elements which allow the user to change various parameters affecting the modeling of the product or affect a control algorithm implemented by the first graphical program. The first one or more graphical user interface elements may also include GUI output elements which allow the user to view variables or aspects related to the modeling of the product.

The second one or more graphical user interface elements for the second graphical program may include input and/or output GUI elements related to the performance or operation of the target device. For example, the second one or more graphical user interface elements may include GUI input elements which allow the user to adjust operation of the measurement function during execution of the second graphical program. The second one or more graphical user interface elements may also include GUI input elements which allow the user to change various parameters or hardware settings of the target device, e.g., to determine how the first graphical program behaves in response. The second one or more graphical user interface elements may also include GUI output elements which allow the user to view variables or aspects related to the operation of the target device or performance of the control algorithm.

BRIEF DESCRIPTION OF THE DRAWINGS

A better understanding of the present invention can be obtained when the following detailed description of the preferred embodiment is considered in conjunction with the following drawings, in which.

Figure 1:
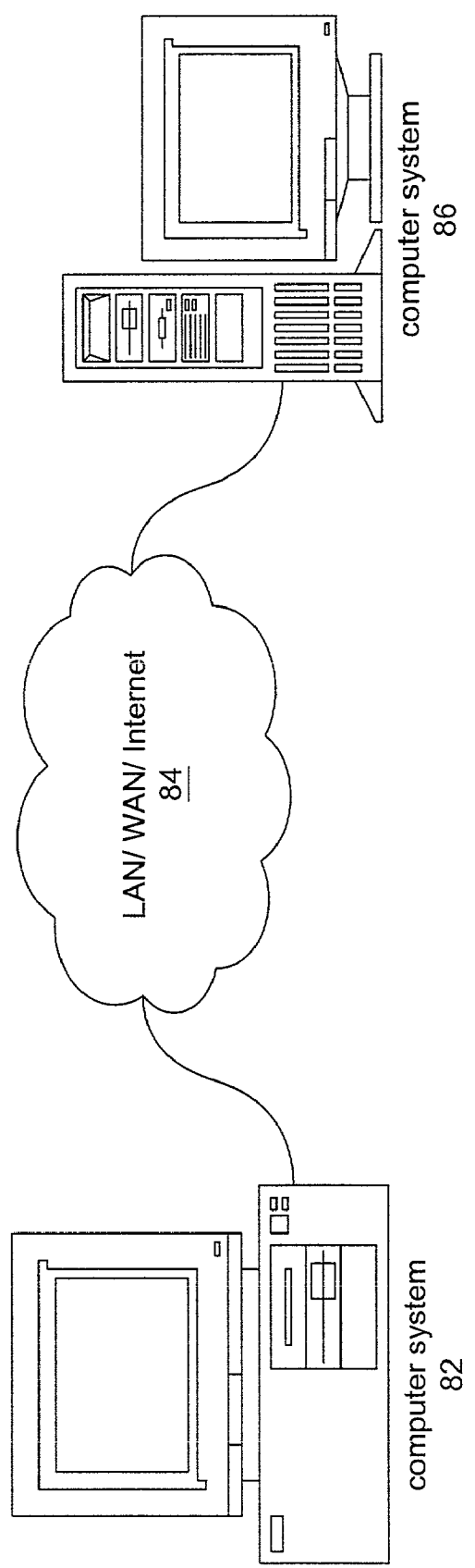
FIG. 1 illustrates a computer system connected through a network to a second computer system.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. Pat. No. 6,064,812 titled "System and Method for Developing Automation Clients Using a Graphical Data Flow Program," issued on May 16, 2000.

U.S. Pat. No. 6,102,965 titled "System and Method for Providing Client/Server Access to Graphical Programs," issued on Aug. 15, 2000.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/136,123 titled "System and Method for Accessing Object Capabilities in a Graphical Program," filed Aug. 18, 1998.

U.S. patent application Ser. No. 09/518,492 titled "System and Method for Programmatically Creating a Graphical Program," filed Mar. 3, 2000.

U.S. patent application Ser. No. 09/617,600 titled "Graphical Programming System with Distributed Block Diagram Execution and Front Panel Display," filed Jun. 13, 2000.

U.S. patent application Ser. No. 09/737,639 titled "System and Method for Automatically Configuring Program Data Exchange," filed Dec. 13, 2000.

U.S. patent application Ser. No. 09/737,528 titled "System and Method for Automatically Configuring a Graphical Program to Publish or Subscribe to Data," filed Dec. 13, 2000.

U.S. patent application Ser. No. 09/737,527 titled "System and Method for Configuring a GUI Element to Publish or Subscribe to Data," filed Dec. 13, 2000.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

In one embodiment, the computer system 82 may execute two graphical programs or block diagrams, both of which produce program output intended for display. According to one embodiment of a method for providing a single graphical user interface (GUI) shared by a plurality of graphical programs, described in detail below, the program output of the two graphical programs may be displayed in a single graphical user interface. Also, in response to receiving user input to the single graphical user interface, the user input may be provided to one or both of the graphical programs.

In one embodiment, the single graphical user interface may be displayed on a display of the computer system 82. In another embodiment, the single graphical user interface may be displayed on the computer system 86. In the latter instance, the computer system 86 may receive information enabling display of the program output in the single graphical user interface via the network 84. The above-incorporated patent application titled "Graphical Programming System with Distributed Block Diagram Execution and Front Panel Display" describes one embodiment of a method enabling graphical program execution and GUI display of the graphical program output to be distributed across multiple computer systems.

In one embodiment, the computer system 82 may execute one graphical program, and the computer system 86 may execute another graphical program. Program output from the two graphical programs may be displayed in a single graphical user interface on a display of the computer system 82, the computer system 86, and/or another computer system (not shown) coupled to these computer systems. User input received via the single graphical user interface may be provided to the graphical program executing on the computer system 82 and/or the graphical program executing on the computer system 86.

As noted above, the graphical program(s) may execute in any type of computer system. In general, the term "computer system" can be broadly defined to encompass any device having at least one processor which executes instructions from a memory medium. In one embodiment, at least one of the graphical programs may execute in a real time system, an embedded device, or in a programmable hardware device. For example, some graphical program development environments provide support for automatically converting a graphical program to a format that can be executed on a programmable hardware device, such as an FPGA device, and downloading the converted graphical program to the programmable hardware device for execution.

It is noted that the invention is not limited in number to two separate graphical programs sharing a single graphical user interface. On the contrary, program output from any number of graphical programs may be displayed in the single graphical user interface, and the single GUI may receive user input to be provided to any number of graphical programs. Similarly as described above, the graphical programs may all execute on the same computer system, or each graphical program may execute on a different computer system, or some computer systems may execute multiple graphical programs while others execute a single graphical program.

It is also noted that in one embodiment, one or more of the programs whose output is displayed on the single graphical user interface may not be a graphical program. For example, one of the programs may be a text-based program, such as a C, C++, Java, Visual Basic, or other type of text-based program. However, in the preferred embodiment, at least one of the programs is a graphical program.

Figure 2A:
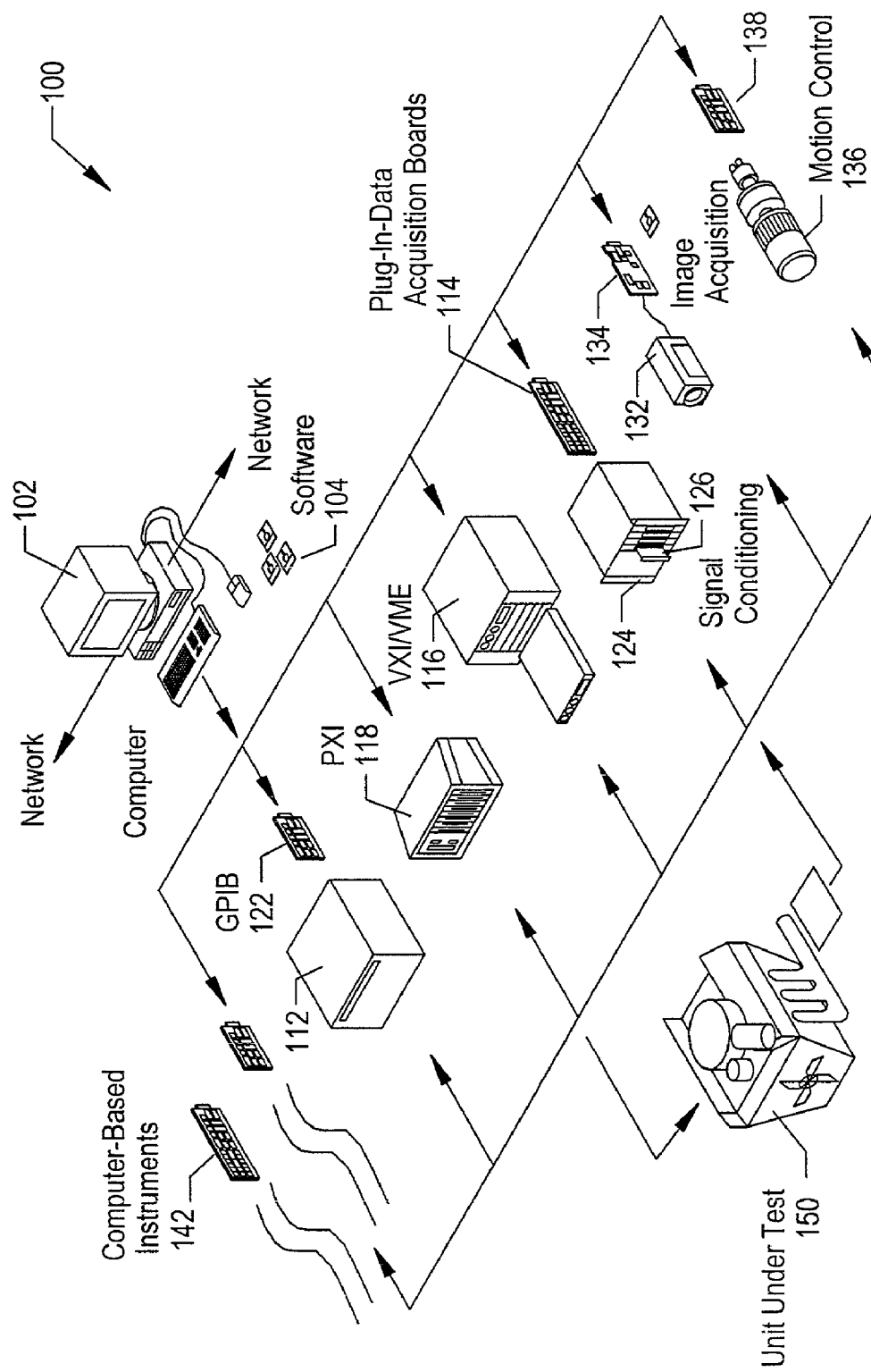
FIGS. 2A and 2B illustrate representative instrumentation and process control systems including various I/O interface options.
Figure 2B:
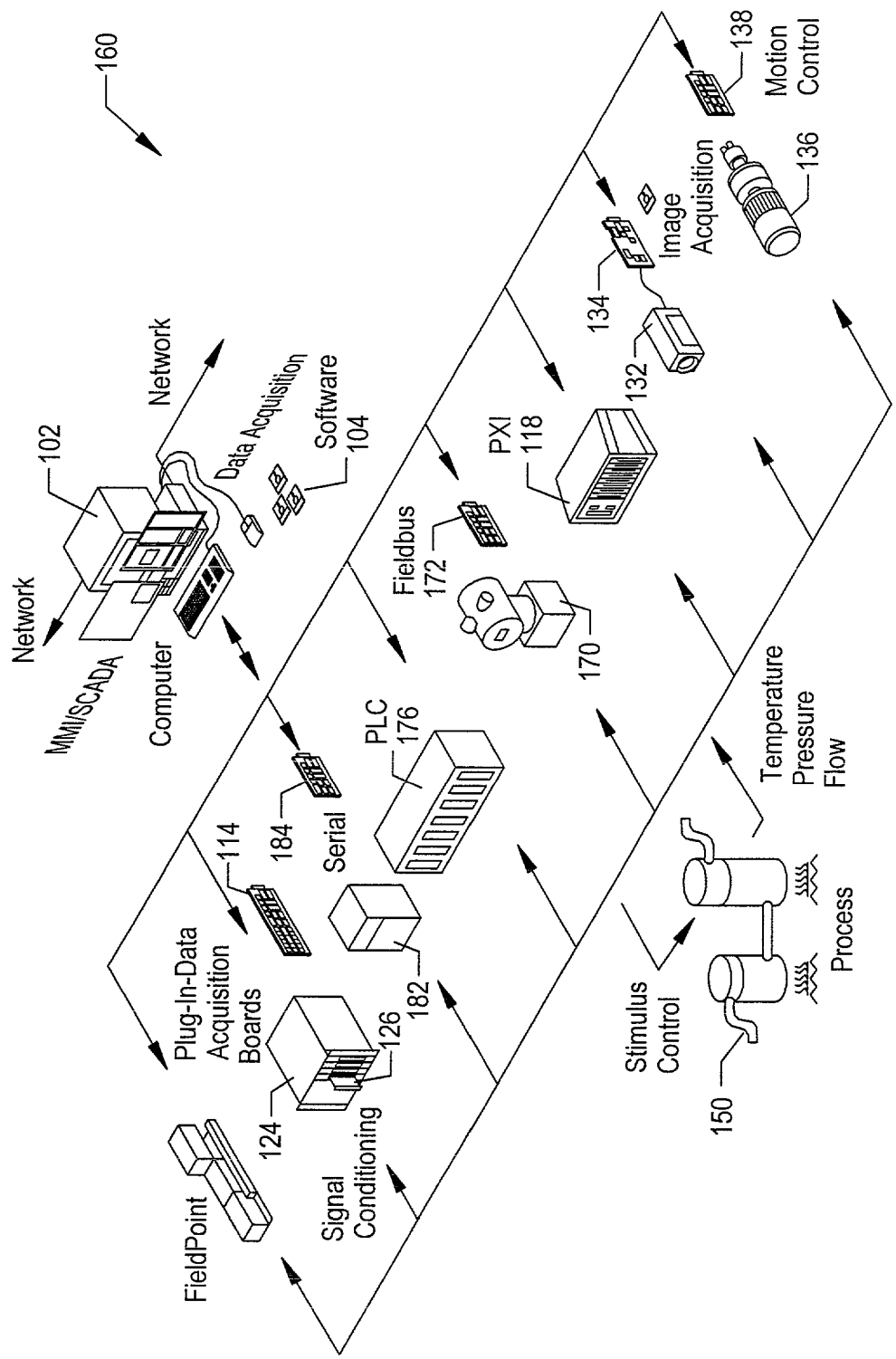

FIGS. 2A and 2B—Instrumentation and Industrial Automation Systems

FIGS. 2A and 2B illustrate exemplary computer systems which may execute one or more graphical programs whose output is displayed on a single graphical user interface as described above. For example, the graphical program(s) may perform an instrumentation function, such as a test and measurement function or an industrial automation function. It is noted that the graphical programs may be stored in or used by any of various other types of systems as desired and may implement any function or application as desired. Thus, FIGS. 2A and 2B are exemplary only.

FIG. 2A illustrates an exemplary instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150. In one embodiment, the computer 102 may be either of the computers 82 or 86 shown in FIG. 1.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the WJUT. The signal conditioning circuitry 124 preferably comprises an SCXI (Signal Conditioning extensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment, the computer 102 may be either of the computers 82 or 86 shown in FIG. 1.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system(s) 102 may each include a memory medium(s) on which one or more computer programs or software components according to one embodiment of the present invention may be stored. For example, the memory medium may store one or more graphical programs operable to provide program output to a graphical user interface that is shared with another graphical program. Also, the memory medium may store one or more graphical program development environments used to create such graphical programs. As described below, in one embodiment different graphical program development environments may be used to create the graphical programs; thus, the memory medium may store multiple graphical program development environments. In one embodiment, the memory medium may also store software for managing the execution of the graphical program(s) and/or managing the display of the single graphical user interface.

It is noted that various of these software programs may be stored on different computer systems, e.g., in an embodiment such as described above where one of the graphical programs is executed or created on a different computer system or where the single graphical user interface is displayed on a different computer system. Also, in various embodiments, various of the above software programs may be implemented or combined in different ways. For example, a graphical program development application may be operable to create the graphical programs as well as manage the display of the program output in the single graphical user interface.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

Figure 3:
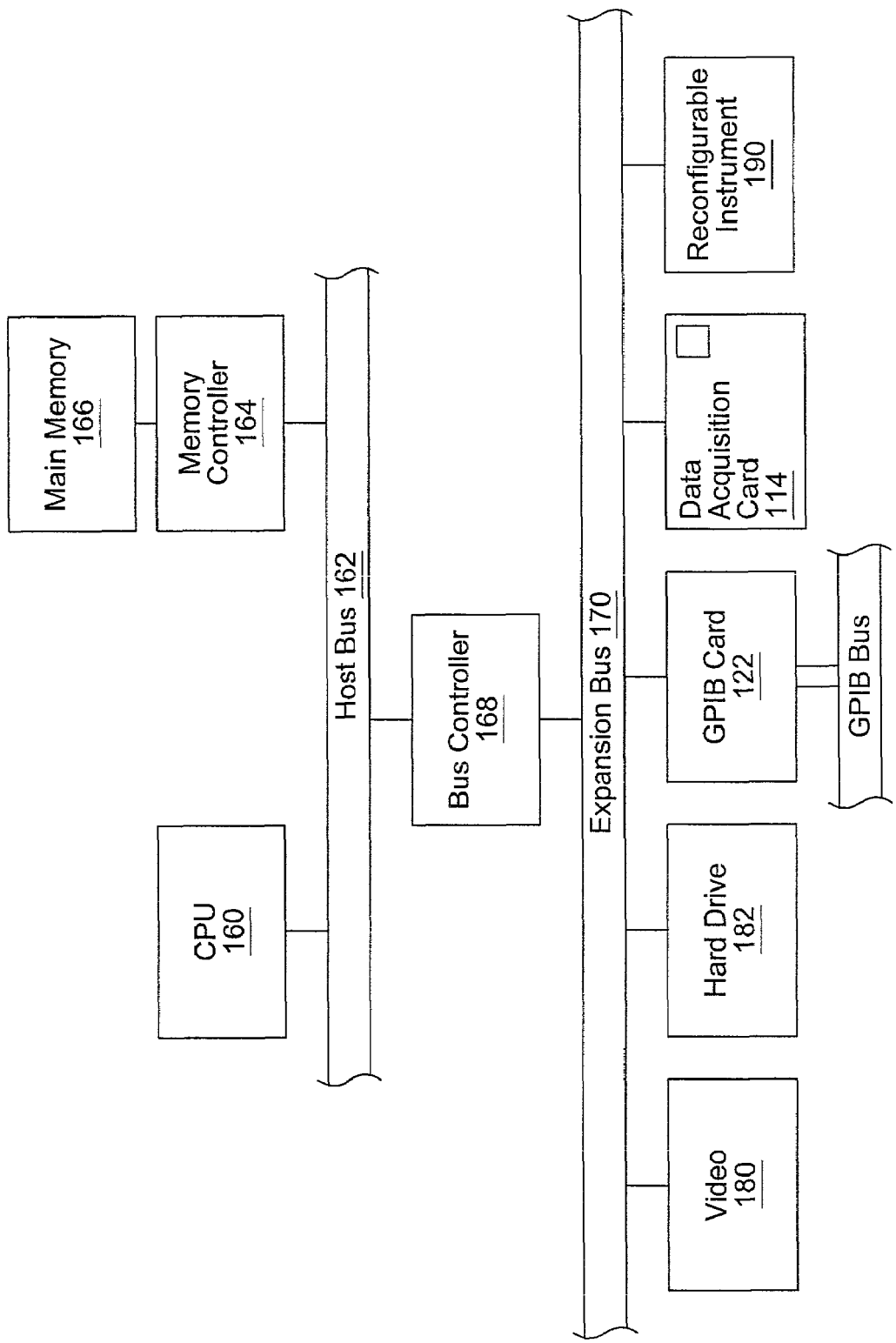
FIG. 3 is a block diagram of the computer system of FIGS. 1, 2A and 2B.

FIG. 3—Computer System Block Diagram

FIG. 3 is a block diagram of the computer system illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to one embodiment of the present invention. For example, the main memory 166 may store one or more graphical programs operable to provide program output to a graphical user interface that is shared with another graphical program. The main memory 166 may also store operating system software as well as other software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A) and a GPIB interface card 122 which provides a GPIB bus interface to the GPIB instrument 112 (of FIG. 2A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. According to one embodiment of the invention, a graphical program may be downloaded and executed on the reconfigurable instrument 190. For example, a graphical program development environment with which the graphical program is associated may provide support for downloading a graphical program for execution on configurable logic in a real time system. Output from the graphical program may be displayed in a graphical user interface displayed by the video display subsystem 180, wherein the graphical user interface also displays program output of another graphical program.

In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 2A.

Figure 4:
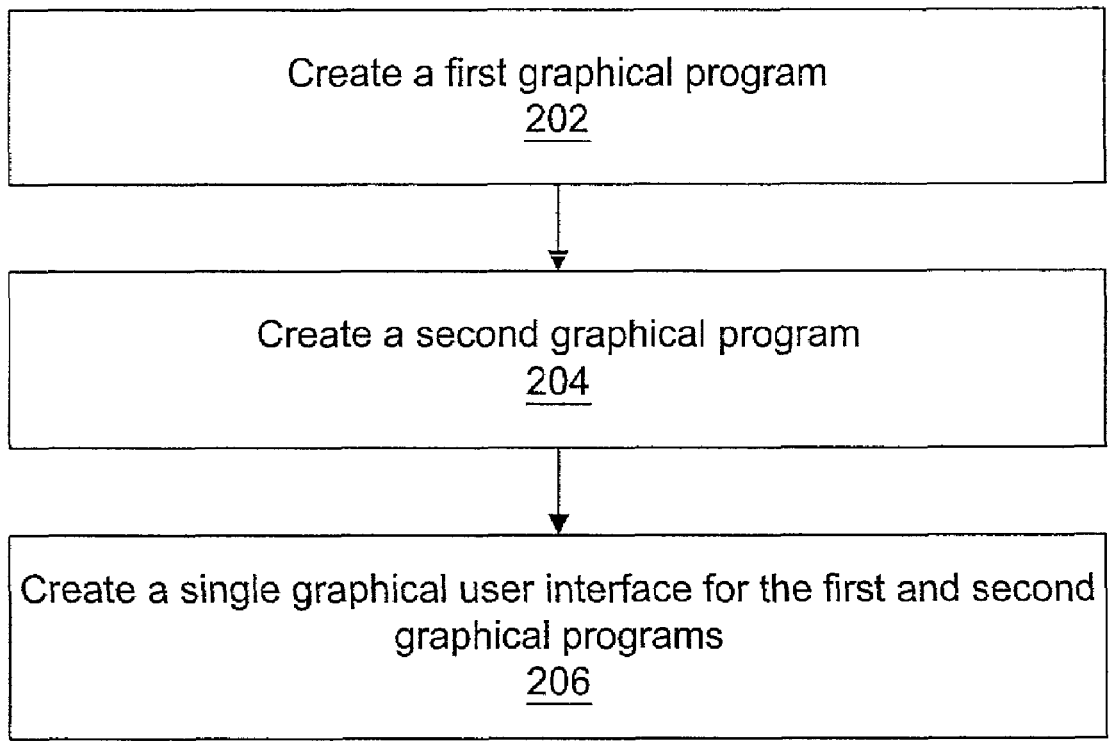
FIG. 4 is a flowchart diagram illustrating one embodiment of a method for creating multiple graphical programs and a single user interface used by the multiple graphical programs.

FIG. 4—Creation of Multiple Graphical Programs Sharing a Common User Interface FIG. 4 is a flowchart diagram illustrating one embodiment of a method for creating a plurality of graphical programs or block diagrams which share a common graphical user interface or a common front panel. It is noted that the steps below may be performed in different orders than that shown.

As used herein, the term "graphical program" includes a program comprising a plurality of interconnected nodes or icons, wherein the plurality of nodes or icons may be interconnected to visually indicate the functionality of the graphical program. Each graphical program may be said to have "graphical code" or "graphical source code", wherein the plurality of interconnected nodes comprise the source code of the graphical program. The term "graphical program" may comprise a block diagram having a plurality of interconnected nodes which visually indicate functionality of the program. As one example, the term "graphical program" may comprise a block diagram having a plurality of interconnected nodes which visually indicate functionality of a product or device being modeled, such as a control unit or other device. A graphical program or block diagram may have one or more of data flow, control flow, execution flow, and/or state diagram representations.

Examples of graphical program development environments that may be used to create and/or execute graphical programs include LabVIEW, DasyLab, and DiaDem from National Instruments, VEE from Agilent, WiT from Coreco, Vision Program Manager from PPT Vision, SoftWIRE from Measurement Computing, Simulink from the MathWorks, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

A graphical program may also include a graphical user interface or front panel. The graphical user interface or front panel may comprise one or more windows or panels that include one or more input interface elements and one or more output interface elements, wherein the one or more input interface elements can be used to interactively assign input values to the corresponding block diagram during program execution, and the one or more input interface elements display the assigned values, and wherein the one or more output interface elements display resulting output values produced by the block diagram.

In step 202, a first graphical program may be created. The first graphical program may be created in response to direct user input, e.g., the user may create the first graphical program by placing or "dragging and dropping" icons or nodes on the display and interconnecting the nodes in a desired fashion. Alternatively, the first graphical program may be programmatically created from a program specification. The first graphical program may be any type of graphical program and may be created in or using any graphical program development environment, such as Lab-VIEW, Simulink, VEE, or another graphical program development environment. The graphical program may include a plurality of interconnected nodes arranged in a block diagram, wherein the interconnected nodes visually indicate functionality of the graphical program. The first graphical program may be executed on any kind of computer system or reconfigurable hardware, as described above.

In step 204, a second graphical program may be created. The second graphical program may also be created in response to direct user input or may be programmatically created. The second graphical program may be any type of graphical program and may be created in or using any graphical program development environment. Thus the second graphical program may be created in or based on the same or a different graphical program development environment as the first graphical program. The second graphical program may thus be the same or a different type of graphical program as the first graphical program. The second graphical program may be created on the same computer system as the first graphical program or on a different computer system. As described above with reference to FIG. 1, the second graphical program may execute on the same computer system as the first graphical program or on a different computer system.

In the preferred embodiment, the first and second graphical programs comprise graphical data flow programs. In a graphical data flow program, data flow is the main principle or visual metaphor governing program design or creation. In other words, in a graphical program that is based on a data flow model, lines or wires between nodes indicate that data produced by one node is used by another node. Thus in a data flow diagram, the data relationships between nodes, i.e., that data provided by a first node is used by a second node, is the visual metaphor used by the user in creating the diagram.

It is noted that the actual execution model for executing a data flow diagram may or may not use data flow execution principles. In one data flow execution embodiment a node may execute when all data inputs have arrived at the node's input terminals. The node may then supply data to its output terminals when the node has finished executing, and this data may then (may immediately) pass to input terminals of other nodes in the diagram that are connected to the node's output terminals. Thus, for this type of data flow execution embodiment, execution of different portions of the program is data-driven. Some graphical program development environments also enable a layer of control flow to be introduced in a graphical data flow program. Control flow constructs may be placed in the data flow diagram so that an execution order for different portions of the graphical program may be explicitly specified to force the portions to execute in a desired sequential order. For example, the LabVIEW graphical program development environment provides sequence structures to accomplish control flow.

In step 206, a graphical user interface or front panel may be created for the first and second graphical programs. As described below with reference to FIG. 5, this graphical user interface or front panel may comprise a single graphical user interface that is shared by the first and second graphical programs. Thus, program output from each graphical program may be displayed in the graphical user interface or front panel, and the graphical user interface or front panel may be used to provide program input to one or more of the graphical programs.

In one embodiment, creating the graphical user interface or front panel may comprise specifying various GUI elements for receiving program input and/or displaying program output. Examples of GUI elements include GUI controls and indicators such as charts, graphs, push buttons, knobs, numeric controls, text boxes, list boxes, check boxes, menu bars, context menus, etc. For example, the LabVIEW graphical program development environment, available from National Instruments Corporation, provides various GUI elements for inclusion in a graphical user interface.

In one embodiment, the graphical user interface may be created using the graphical program development environment that was used in creating the first graphical program or the second graphical program. Where the first and second graphical programs are created in the same graphical program development environment, the graphical user interface or front panel is preferably created in that graphical program development environment. Where the first and second graphical programs are created in different graphical program development environments, the graphical user interface or front panel is preferably created in one of the respective graphical program development environments.

Alternatively, in one embodiment the user may use each of two or more graphical program development environments to specify different respective portions of the graphical user interface. For example, the user may use a first graphical program development environment to specify one or more first GUI elements in the graphical user interface, and may use a second graphical program development environment to specify one or more second GUI elements in the graphical user interface. Thus the graphical user interface may comprise GUI elements from two or more different graphical program development environments. Each respective graphical program may thus operate to interface with a corresponding subset of GUI elements that are associated with the same graphical program development environment as the respective graphical program.

In one embodiment, in order to allow GUI elements and graphical program nodes from different graphical program development environments to communicate with each other, each of the different graphical program development environments may utilize a pre-defined application programming interface (API). For example, the GUI elements in the graphical user interface may be software objects or components, such as ActiveX controls, Java components, etc., that conform to a pre-defined API. This pre-defined API may allow the GUI elements to communicate with graphical programs created according to any of various graphical program development environments. For example, a node in a graphical program may use the pre-defined API to publish data to and/or subscribe to data from a respective GUI element. As another example, each of the GUI elements may have a corresponding uniform resource locator (URL) that allows nodes in graphical programs created in various graphical program development environments to publish data to and/or subscribe to data from a respective GUI element using the URL. The URL may specify the URL of the computer system in which the graphical user interface is located and the path of the respective GUI element in the user interface. Thus, configuring a node in a graphical program to publish or subscribe to data with a respective GUI element may involve specifying the URL of the respective GUI element with which the node is to communicate.

Communication between a graphical program and the user interface may occur using a defined protocol, such as TCP/IP, or the DataSocket protocol developed by National Instruments, or any other standard or proprietary protocol.

Configuring the graphical programs to share the graphical user interface may be performed in various ways, e.g., depending on the particular graphical program development environment(s) used to create the graphical programs. As noted above, the graphical user interface may include various GUI controls and indicators. In many graphical program development environments, configuring a graphical program to display program output on a graphical user interface involves connecting an output terminal of a node in the block diagram of the graphical program to a node that represents a particular GUI indicator in the graphical user interface, i.e., the GUI indicator that the user desires to display the program output. Similarly, configuring a graphical program to receive program input from a graphical user interface may involve connecting an input terminal of a node in the block diagram to a node that represents a particular GUI control in the graphical user interface. A node that represents a GUI control or indicator may also be referred to as a "terminal". In configuring the multiple graphical programs to share a single graphical user interface, a similar technique may be used. Thus, when creating the graphical programs, block diagram nodes may be connected to GUI element terminals to configure the block diagram nodes to interact with the respective GUI elements.

In one embodiment, the GUI elements in the graphical user interface or front panel may be specified or created first, before the terminals corresponding to the GUI elements appear in the block diagrams of the graphical programs. For example, when the user places GUI elements or front panel elements in the graphical user interface or front panel, corresponding terminals may appear in one or more of the graphical programs or block diagrams as nodes that may be connected to other nodes in the graphical programs. In one embodiment, when the user specifies a GUI element, the user may specify which of one or more graphical programs or block diagrams in which the terminals are to appear. The user may specify one or more of the graphical programs based on which of the graphical programs are to use the respective GUI element to receive input or display output. In another embodiment, the terminals may automatically appear in each graphical program, and the user may only "wire up" or connect the desired terminals in selected graphical programs that will read/write from/to the respective GUI element.

In another embodiment, the two or more graphical programs are specified or created first, followed by creation or specification of GUI elements in the graphical user interface or front panel. In this embodiment, the user may create each of the two or more graphical programs, wherein each of the graphical programs includes terminal icons or nodes that indicate respective GUI elements. The graphical user interface or front panel may then be automatically created based on the terminal icons or nodes in each of the graphical programs. In other words, GUI elements may be automatically (or manually) created for each terminal icon or node from each graphical program.

In another embodiment, a second graphical program created according to a second graphical program development environment is included as a sub-node or sub-program in a first graphical program created according to a first graphical program development environment. In this embodiment, the first and second graphical programs may each have GUI elements in the graphical user interface or front panel.

In one embodiment, the graphical user interface may be created and/or stored independently of each of the graphical programs. In this case, at program development time the graphical program development environment(s) may enable the user to select a graphical user interface to use, e.g., by selecting a file representing the graphical user interface. The graphical program development environment may then be operable to determine the GUI elements included in the selected graphical user interface. Terminals corresponding to these GUI elements may then be automatically included in the block diagram so that the user can connect block diagram nodes to the terminals to configure the block diagram to interact with the GUI elements. Alternatively, the terminals may be made available for selection and inclusion in the block diagram. For example, the terminals may appear in a palette, and the user may select the desired terminals to include in the block diagram.

In another embodiment, the graphical user interface may be more closely coupled with one or more of the graphical programs. For example, as the user interactively edits the graphical user interface, the graphical program(s) may automatically be updated to reflect the changes. For example, as described above, if the user adds a GUI element to the graphical user interface, a corresponding terminal may automatically appear in the graphical program(s).

Figure 5:
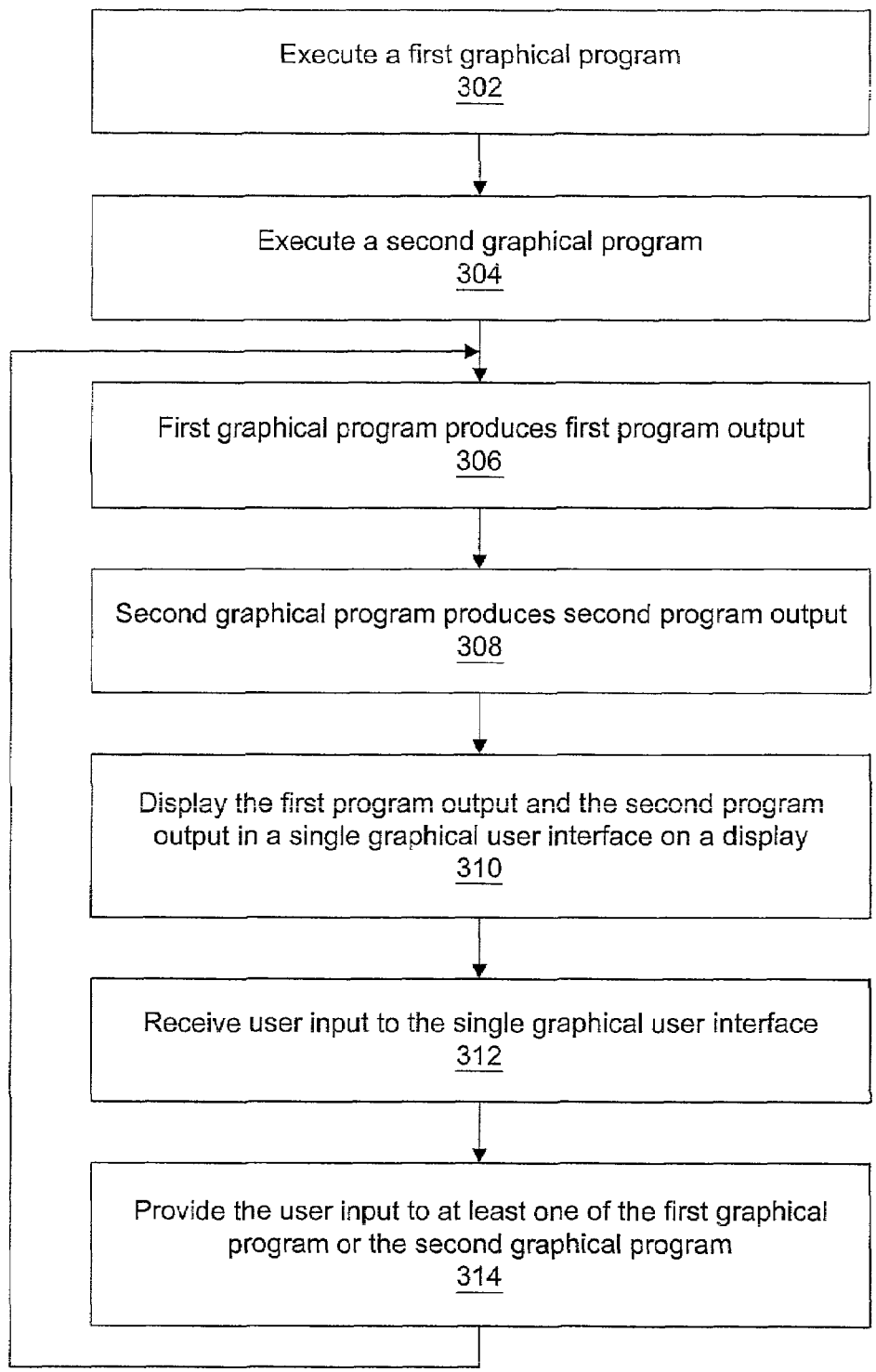
FIG. 5 is a flowchart diagram illustrating one embodiment of a method for executing multiple graphical programs, in which program output from each graphical program is displayed in a single graphical user interface.

FIG. 5—Execution of the Graphical Programs and the Shared Graphical User Interface FIG. 5 is a flowchart diagram illustrating one embodiment of a method for executing graphical programs, in which program output from each graphical program is displayed in a single graphical user interface and/or program input is provided to each graphical program from the single graphical user interface.

In step 302, a first graphical program is executed. The first graphical program may be any type of graphical program and may be created using any graphical program development environment, as described above. The first graphical program may be executed on any kind of computer system desired, including reconfigurable hardware such as an FPGA.

In step 304, a second graphical program is executed. The second graphical program may also be any type of graphical program and may be the same or a different type of graphical program as the first graphical program, e.g., may be associated with the same or a different graphical program development environment. As described above with reference to FIG. 1, the second graphical program may execute on the same computer system as the first graphical program or on a different computer system.

In step 306, the first graphical program may produce first program output. In step 308, the second graphical program may produce second program output. For example, the nodes in the block diagrams of the graphical programs may be operable to acquire, produce, and/or process data and output the results. The program output may comprise any type of output, including numeric, text, or graphical data and may comprise output that is produced in a single instance, periodically, or continuously.

In step 310, the first program output and the second program output may be displayed in a single graphical user interface on a display. For example, the display may be a display of the computer system that executes one of the first and/or the second graphical program, or may be a display of a remote computer system connected via a network.

Where the single graphical user interface is displayed on a remote computer system, any desired method may be used to perform the remote display. One method for enabling the remote display is described in the above-incorporated patent application titled "Graphical Programming System with Distributed Block Diagram Execution and Front Panel Display". In addition, any of various communication mechanisms may be used to transfer data between the computer systems executing the graphical programs and the computer system displaying the user interface.

Figure 8:
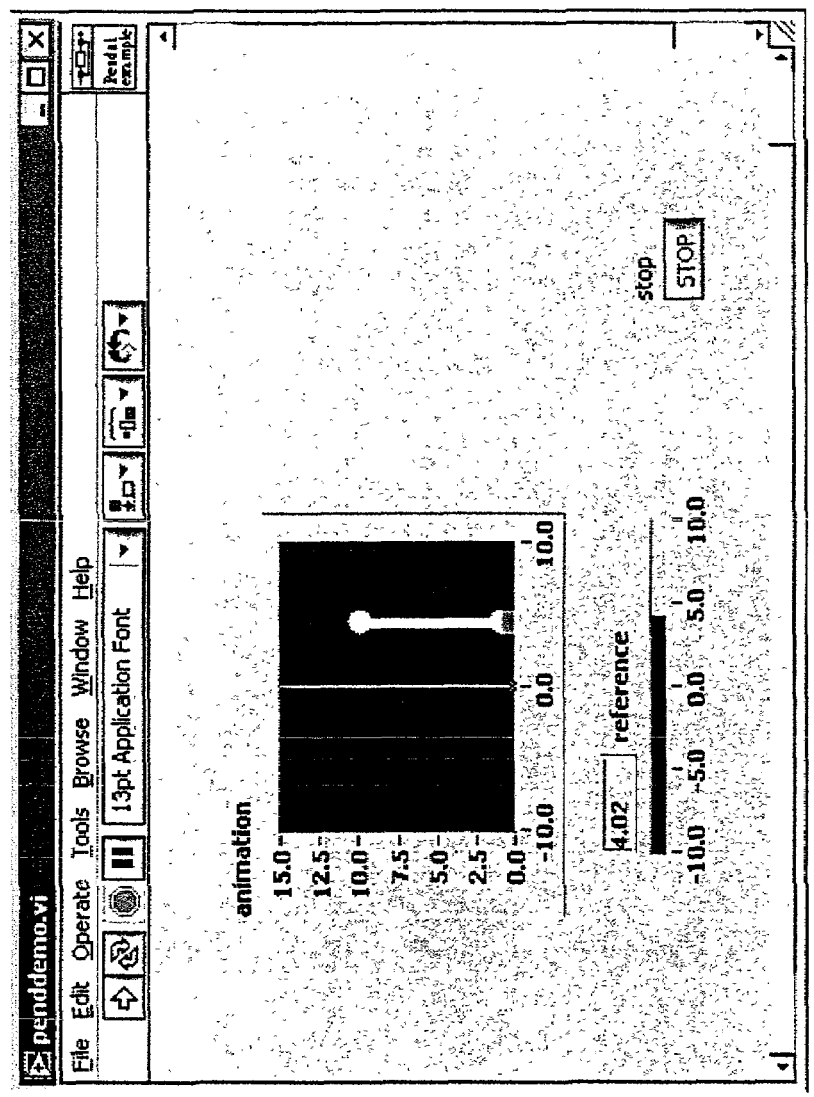

The single graphical user interface may comprise any type of graphical user interface, as desired. In the preferred embodiment, the graphical user interface comprises a single window comprising one or more GUI elements. Thus, output from multiple graphical programs may be displayed in a single window. Alternatively, the single graphical user interface may comprise a plurality of GUI elements that are not contained in a single window, e.g., each GUI element may have its own "window". In an embodiment where the single graphical user interface is displayed on a system that does not support GUI windows, the single graphical user interface may comprise other elements, i.e., those GUI elements that are supported by the system. The single graphical user interface may include GUI indicators operable to display the first and second program output. Also, the single graphical user interface may include GUI controls for specifying program input to the first and/or the second graphical program, as described below. Examples of GUI controls and indicators include charts, graphs, push buttons, knobs, numeric controls, text boxes, check boxes, list boxes, etc. An exemplary single graphical user interface is illustrated in FIG. 8.

As shown in steps 312 and 314, in one embodiment, the single graphical user interface may also be used for specifying program input for the first and/or the second graphical program. For example, as described above, the single graphical user interface may include GUI controls such as push buttons, knobs, check boxes, menu bars, etc., for receiving program input. In step 312, the program input may be received to the single graphical user interface. In step 314, the program input may be provided to at least one of the first graphical program or the second graphical program.

In one embodiment, the program input may be user input. That is, the user may interact with a GUI control to affect the application. In another embodiment, the program input may be program output of one of the graphical programs. For example, a first graphical program may be operable to programmatically set a GUI control to a particular value, and a second graphical program may be operable to receive the GUI control value as program input.

As indicated by the arrow from step 314 to step 306, the process of displaying the program output from the graphical programs and providing the program input to the graphical programs may be performed multiple times. Also, these steps may be performed in various orders. In other words, in steps 306–314, the single graphical user interface may seem to the user much the same as a standard graphical user interface for a single program.

Although the method is described above in terms of two separate graphical programs, it is noted that any number of graphical programs may share the single graphical user interface. Also, in one embodiment, one or more graphical programs may share a single graphical user interface with another type of program, e.g., a text-based program such as a C, C++, Java, Visual Basic, or other type of text-based program. Also, in the description above, the single graphical user interface is used both for display of program output and for receiving program input. In other embodiments, the single graphical user interface may only display program output or may only receive program input.

The multiple graphical programs may share the single graphical user interface in any of various ways. For example, in one embodiment, each GUI control or indicator in the single graphical user interface may be used by only a single graphical program. That is, for each GUI control or indicator, a single graphical program receives data from and/or provides data to the control/indicator. In another embodiment, one or more GUI elements, e.g., GUI controls or indicators, may be shared among multiple graphical programs. For example, a first graphical program may provide data to a GUI control/indicator, and a second graphical program may receive the data from this GUI control/indicator that is provided by the first graphical program. An example of this type of sharing is described below.

In another embodiment, a GUI control may provide input to multiple graphical programs. For example, a first graphical program may execute on a first computer system, a second graphical program may execute on a second computer system, and the single graphical user interface may be displayed on a display of a third computer system. A user may operate a GUI control on the single graphical user interface to provide user input to both the first and second graphical programs. As an example, each graphical program may control an instrumentation system, and the GUI control may be used to specify a common setting for both systems.

In another embodiment, multiple graphical programs may provide data to a single GUI indicator. For example, the single graphical user interface may include a graph GUI indicator that displays measurement data acquired from two systems, where a separate graphical program interacts with each system. A technique for coordinating control of the shared GUI indicator among the multiple graphical programs may be utilized. For example, control may be distributed among the graphical programs using various methods or algorithms, such as a round-robin scheme, prioritized round-robin scheme, etc.

Figure 6:
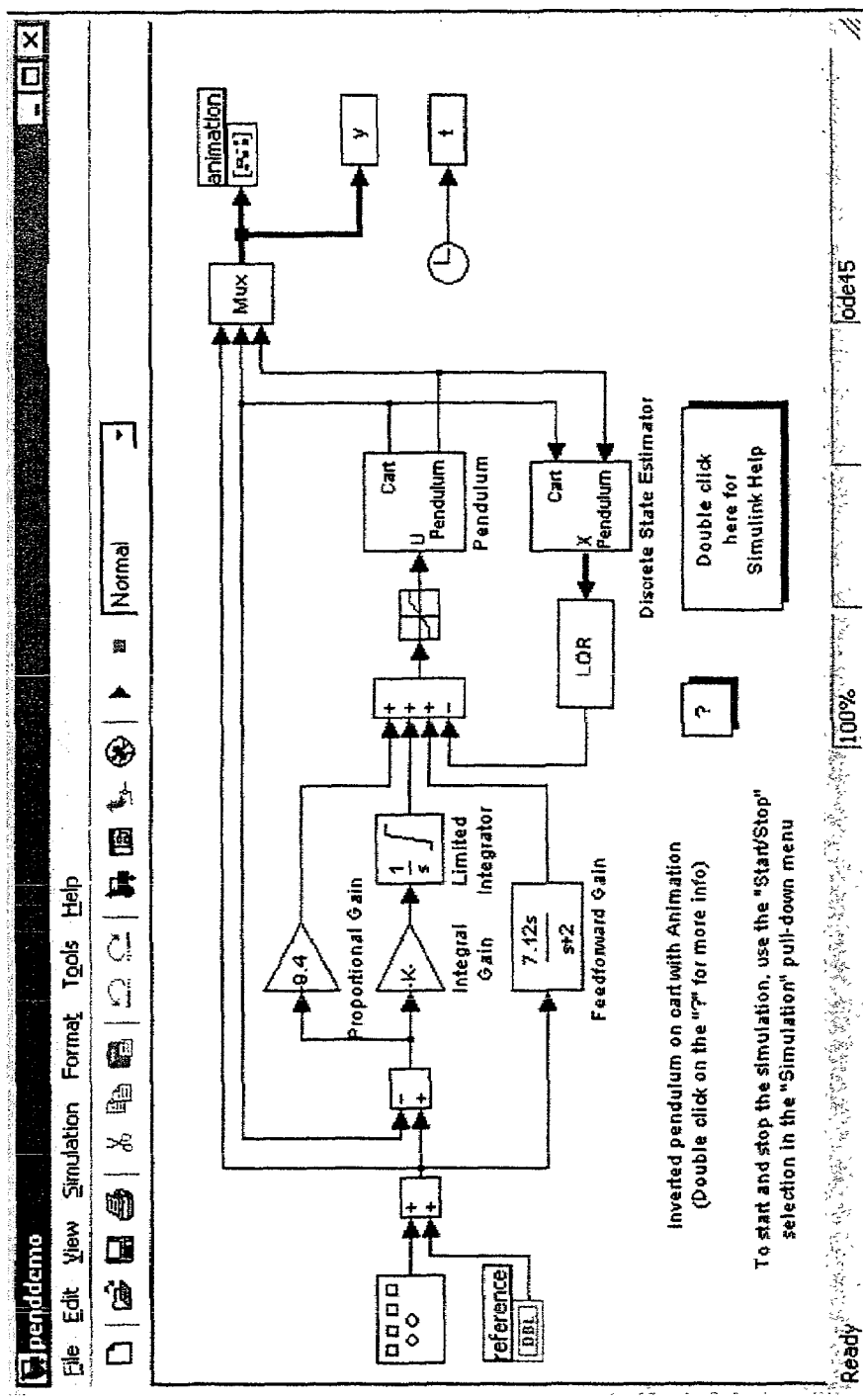
FIGS. 6–8 illustrate an example in which a LabVIEW graphical program shares a single graphical user interface with a Simulink graphical program.
Figure 7:
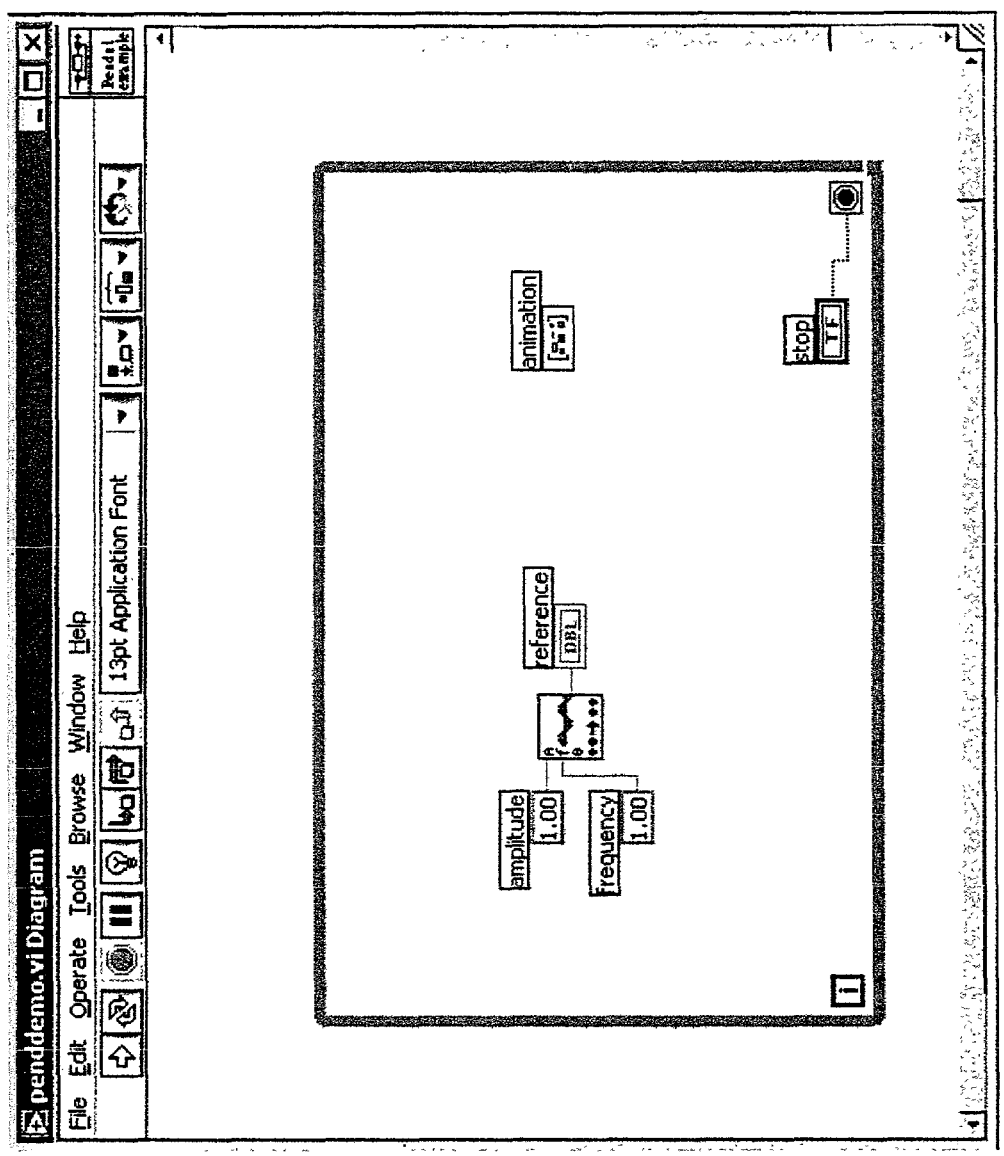

FIGS. 6–8: Example

As noted above, in one embodiment different graphical program development environments may be used to create the separate graphical programs. It may be desirable, for example, to separate the functionality of the application into separate graphical programs and use the best-suited graphical program development environment to implement each separate graphical program. In various embodiments, any combination of graphical program development environments may be used, including LabVIEW, Simulink, and VEE, among others. FIGS. 6–8 illustrate an example in which a LabVIEW graphical program shares a single graphical user interface with a Simulink graphical program. This is a simple example for illustrative purposes.

FIG. 6 illustrates the block diagram of the Simulink graphical program. The Simulink graphical program utilizes various mathematical function nodes to simulate the physical behavior of a controlled, inverted pendulum. The node labeled "reference" (also called a terminal) located on the left of the block diagram of FIG. 6 corresponds to the GUI control labeled "reference" on the graphical user interface illustrated in FIG. 8. The reference GUI control provides program input to the Simulink graphical program. This program input specifies a reference point affecting the motion of the controlled pendulum. The Simulink graphical program simulates the controlled motion of the pendulum, based on the specified reference point, and provides program output to the node labeled "animation" (also called a terminal) located on the right of the block diagram of FIG. 6. The animation node corresponds to the GUI indicator labeled "animation" on the graphical user interface illustrated in FIG. 8, which indicator displays the simulated pendulum motion.

FIG. 7 illustrates the block diagram of the LabVIEW graphical program. The LabVIEW graphical program generates sine data values and outputs the data values to the node labeled "reference" (also called a terminal). The reference node corresponds to the GUI control labeled "reference" on the graphical user interface illustrated in FIG. 8. Whereas the reference GUI control provides program input to the Simulink graphical program, the reference GUI control receives program output of the LabVIEW graphical program. Thus, the LabVIEW graphical program programmatically sets the value of the reference GUI control, and the Simulink graphical program receives these values as program input and uses them to simulate the motion of the pendulum, and these graphical programs share a single graphical user interface.

Measurement and Simulation Programs Sharing a Single Graphical User Interface

Software simulation is often used to test and develop many types of systems or devices. Software simulation can be performed in the development process of a product in various ways. One typical use of simulation is known as "rapid control prototyping (RCP)". A goal of rapid control prototyping is to enable new product prototypes to be implemented and tested on real-time hardware, e.g., before the design of the product has been finalized and before the product has actually gone into production. For example, according to the rapid control prototyping process, a control algorithm can be developed and deployed on a target controller or target device. For example, the target device may include real-time hardware that can execute the control algorithm, e.g., on configurable hardware such as an FPGA or DSP. The target device may be chosen to have characteristics similar to what the production device will have, e.g., in characteristics such as CPU, memory, I/O, etc.

The target controller or device that executes the control algorithm under test may be coupled to a real physical system, i.e., the physical system that the production device will be used to control. Thus, the target device executing the control algorithm may behave much the same as if the production device were controlling the physical system. However, the process of deploying a control algorithm on the target device may be performed significantly easier and more quickly than if a production device were manufactured to test each version of a control algorithm under test. For example, the programming environment used to create the control algorithm may provide support for automatically deploying the algorithm on the target device. Thus, the design/test process may be a very tightly closed loop, allowing designs to be quickly and easily tested and significantly speeding up the product development process.

In various applications, the target device may be coupled to and may control any of various types of physical systems. For example, if an electronic control unit for an automobile engine is being developed, the target device may be coupled to an actual engine, and possibly other components such as transmission, brakes, etc.

In one embodiment of a system for performing rapid control prototyping, a measurement/control program may be utilized to measure characteristics of the target device and/or to control operation of the target device. For example, the measurement/control program may be utilized to gather information that can be analyzed to determine how well the control algorithm under test is performing. Also, the measurement/control program may be utilized to change operation parameters of the target device, e.g., to determine how this affects the operation of the control algorithm under test.

Figure 9:
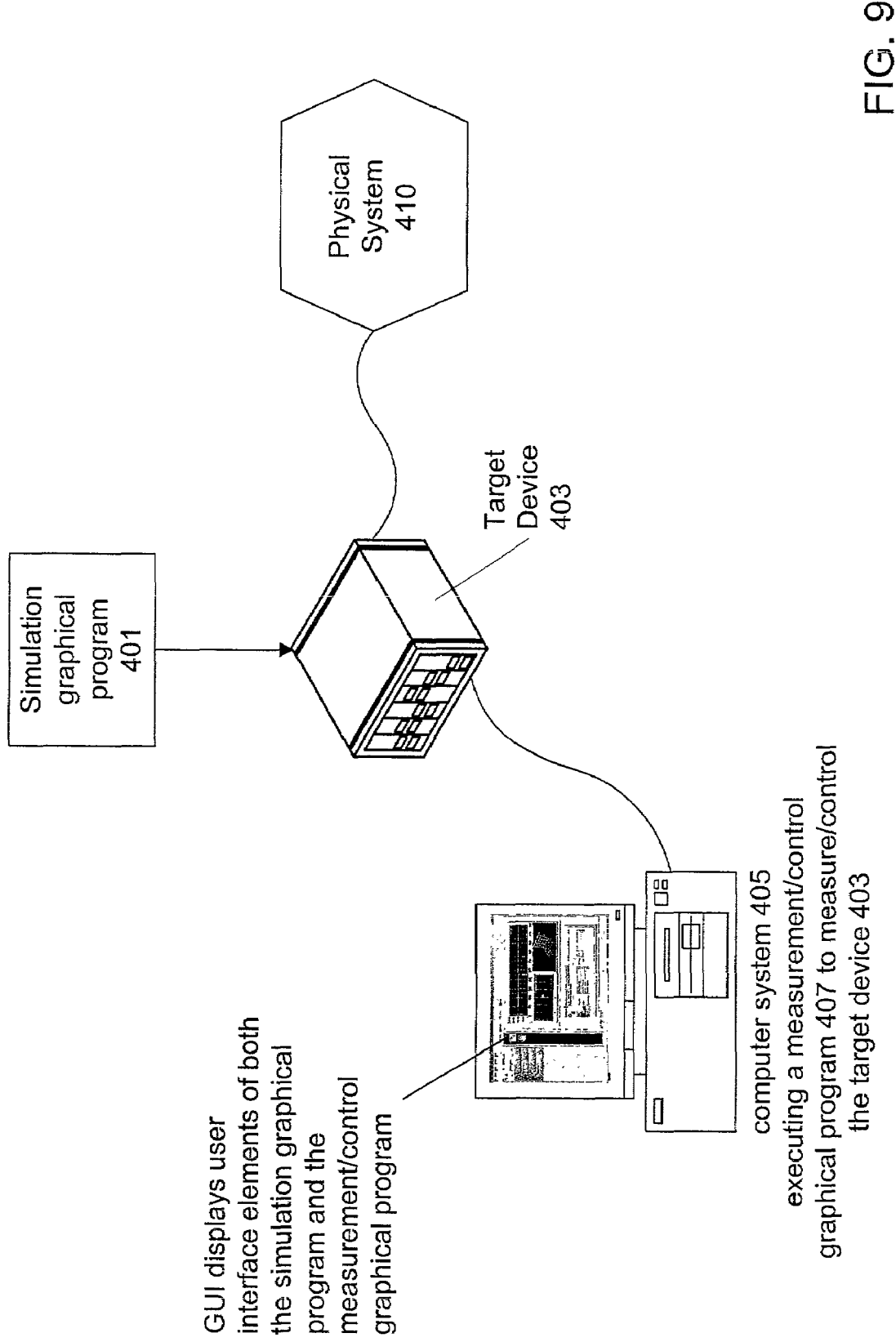
FIG. 9 illustrates one embodiment of a system for performing rapid control prototyping, in which two graphical programs share a single graphical user interface.

FIG. 9 illustrates one embodiment of a system for performing rapid control prototyping. As shown, a simulation graphical program 401 may be deployed on a target device 403. For example, the simulation graphical program may implement a control algorithm under test. The target device 403 may be coupled to a physical system 410. Also, a computer system 405 may be coupled to the target device 403. The computer system 405 may execute a measurement/control graphical program 407 to measure and/or control the target device 403.

The simulation graphical program 401 may have a first one or more associated user interface elements, and the measurement/control graphical program 407 may have a second one or more associated user interface elements. As described above, it may be desirable to display a single graphical user interface that comprises both the first one or more and the second one or more user interface elements. In one embodiment, the single graphical user interface may be displayed on a display screen of the computer system 405. In various other embodiments, the single graphical user interface may be displayed in various other locations, such as on a separate computer system that is coupled to both the computer system 405 and the target device 403.

Figure 10:
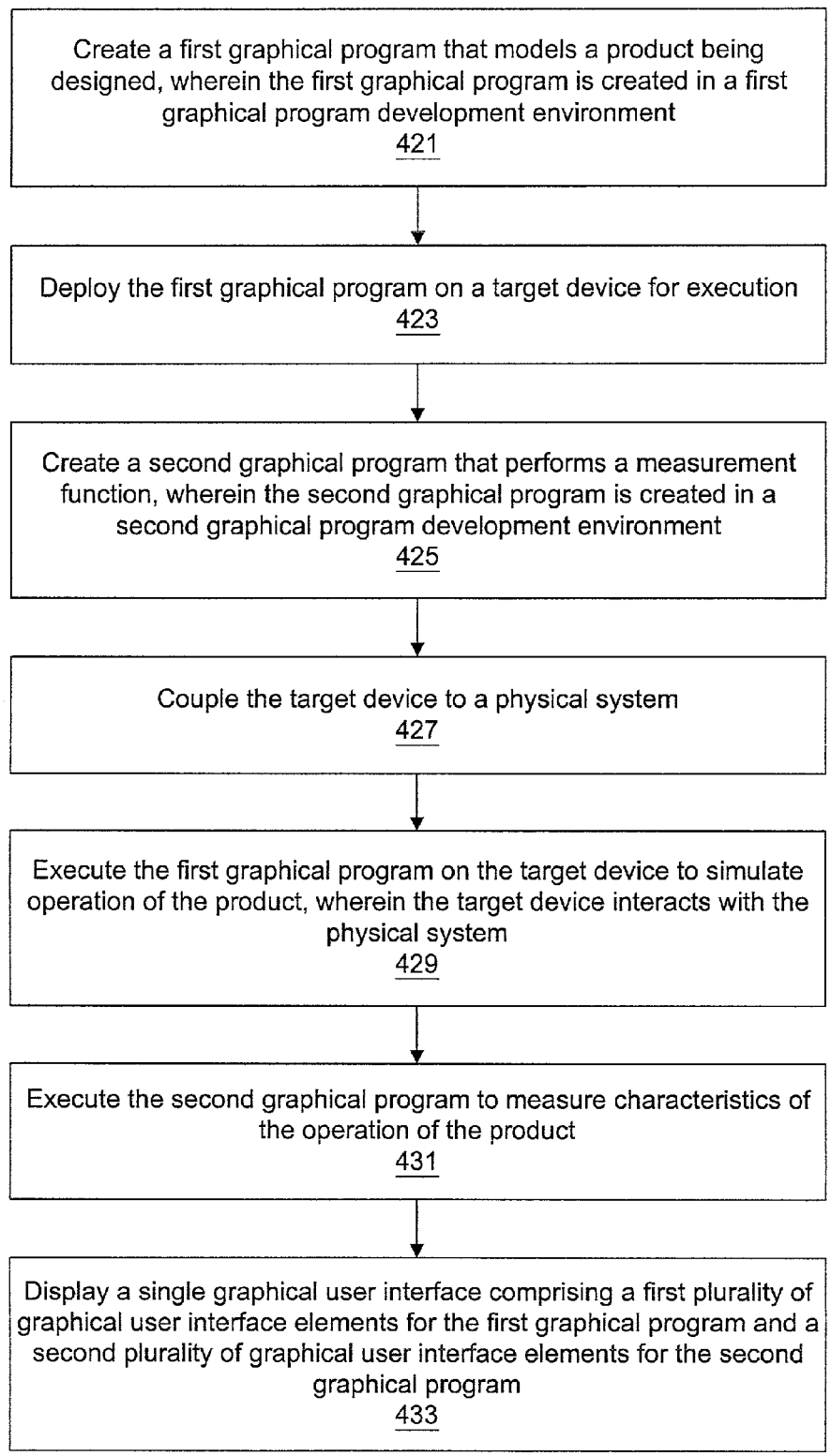
FIG. 10 is a flowchart diagram illustrating one embodiment of a method for performing a rapid control prototyping simulation, in which two graphical programs share a single graphical user interface.

FIG. 10 is a flowchart diagram illustrating one embodiment of a method for performing a rapid control prototyping simulation as described above. It is noted that various steps of FIG. 10 may be performed in different orders, steps may be combined, omitted, or altered, etc.

In step 421, a first graphical program may be created, wherein the first graphical program models a product being designed. For example, in the case of a control unit under design, the first graphical program may implement a control algorithm for the control unit. The first graphical program may be created in a first graphical program development environment. For example, it may be desirable to create the first graphical program using a first graphical program development environment specialized for creating simulation programs.

In step 423, the first graphical program may be deployed on a target device for execution. In various embodiments, any of various types of target devices may be used to execute the first graphical program, and any of various methods may be used to deploy the first graphical program on the target device. The target device may comprise real-time configurable hardware operable to execute the first graphical program. In one embodiment, the target device may be a board comprised in a slot of a computer system, and deploying the first graphical program on the target device may comprise transferring the first graphical program from the computer system to the board. In another embodiment, the target device may be external to a computer system, e.g., may be housed separately from the computer system, and deploying the first graphical program on the target device may comprise transferring the first graphical program from the computer system to the external target device. As one example, the target device may be an external PXI chassis connected to the computer system.

Deploying the first graphical program on the target device may comprise storing the first graphical program in a memory of the target device. In one embodiment, the memory of the target device may also store a graphical program execution engine for executing graphical programs created in the first graphical program development environment. Executing the first graphical program may thus include executing the graphical program execution engine, which may manage execution of the first graphical program on the target device.

In one embodiment, deploying the first graphical program on the target device may comprise converting the first graphical program to machine language code and storing the machine language code in a memory of the target device. For example, the first graphical program may be converted to a program in a text-based programming language, such as C or another text-based programming language. This program may then be compiled to machine language code, and the machine language code may be stored in a memory of the target device. In one embodiment, the target device may include a programmable hardware element, and the first graphical program may be converted to a hardware configuration program. The programmable hardware element on the target device may then be configured according to the hardware configuration program. It is noted that the techniques of converting the original graphical program to various other formats useable for configuring the target device may be largely or completely automatized and thus may require little or no effort on the part of the user. For example, the graphical program development environment used to create the first graphical program may enable the user to request the first graphical program to be deployed on the target device.

In step 425, a second graphical program may be created, wherein the second graphical program performs a measurement function. For example, as described above, the second graphical program may be designed to measure characteristics of the target device that executes the first graphical program. The second graphical program may be created in a second graphical program development environment. For example, it may be desirable to create the second graphical program using a second graphical program development environment specialized for creating measurement programs.

In step 427, the target device may be coupled to a physical system. In various embodiments, the target device may be coupled to the physical system in any of various ways. For example, the target device may include various input/output ports that connect to input/output ports of the physical system. In some cases, intermediate devices may be connected between the target device and the physical system, such as actuators that control the system and/or sensors that provide feedback to the target device.

In step 429, the first graphical program may be executed on the target device to simulate operation of the product. During this execution, the target device may interact with the physical system. For example, in the case of a first graphical program that implements a control algorithm, the target device may execute the control algorithm to control the physical system, as described above.

In step 431, the second graphical program may be executed to measure characteristics of the operation of the product. As shown in FIG. 9, this may comprise executing the second graphical program on a computer system coupled to the target device, wherein the second graphical program measures characteristics of the target device executing the first graphical program. The second graphical program may be executed concurrently with, or at least partially concurrently with, execution of the first graphical program. The target device characteristics measured by the second graphical program may be useful in analyzing operation of the product being developed.

In step 433, a single graphical user interface may be displayed, wherein the single graphical user interface comprises a first one or more graphical user interface elements for the first graphical program and a second one or more graphical user interface elements for the second graphical program. As described above, the single graphical user interface may be displayed in any of various locations, such as on a computer system that executes the second graphical program or on another computer system.

The single graphical user interface may have been previously created or defined in response to user input assembling the first one or more graphical user interface elements and the second one or more graphical user interface elements on a display. For example, the first one or more graphical user interface elements and the second one or more graphical user interface elements may be assembled on a single window of a display or on a single front panel in response to user input. In one embodiment, the first one or more graphical user interface elements may be selected from the first graphical program development environment, and the second one or more graphical user interface elements may be selected from the second graphical program development environment. In one embodiment, the first one or more graphical user interface elements may be selected from the first graphical program development environment, and the single graphical user interface may be created in the second graphical program development environment, wherein creating the single graphical user interface comprises including the first one or more graphical user interface elements selected from the first graphical program development environment in the single graphical user interface. The second one or more graphical user interface elements may then be selected from the second graphical program development environment.

In another embodiment, both the first one or more graphical user interface elements and the second one or more graphical user interface elements may be selected from the second graphical program development environment, or both the first one or more elements and the second one or more elements may be selected from the first graphical program development environment.

The first one or more graphical user interface elements for the first graphical program may include input and/or output GUI elements related to the operation of or the modeling performed by the first graphical program. For example, the first one or more graphical user interface elements may include GUI input elements which allow the user to change various parameters affecting the modeling of the product or affect a control algorithm implemented by the first graphical program. The first one or more graphical user interface elements may also include GUI output elements which allow the user to view variables or aspects related to the modeling of the product.

The second one or more graphical user interface elements for the second graphical program may include input and/or output GUI elements related to the performance or operation of the target device. For example, the second one or more graphical user interface elements may include GUI input elements which allow the user to adjust operation of the measurement function during execution of the second graphical program. The second one or more graphical user interface elements may also include GUI input elements which allow the user to change various parameters or hardware settings of the target device, e.g., to determine how the first graphical program behaves in response. The second one or more graphical user interface elements may also include GUI output elements which allow the user to view variables or aspects related to the operation of the target device or performance of the control algorithm.

In another embodiment of a system for performing rapid control prototyping, a measurement/control program may be utilized to measure characteristics of the physical system and/or to control operation of the physical system. For example, the measurement/control program may be utilized to gather information from the physical system that can be analyzed to determine how well the target device is controlling the physical system. Also, the measurement/control program may be utilized to control the physical system, e.g., to determine how the target device responds to a change in one or more variables of the physical system.

Figure 11:
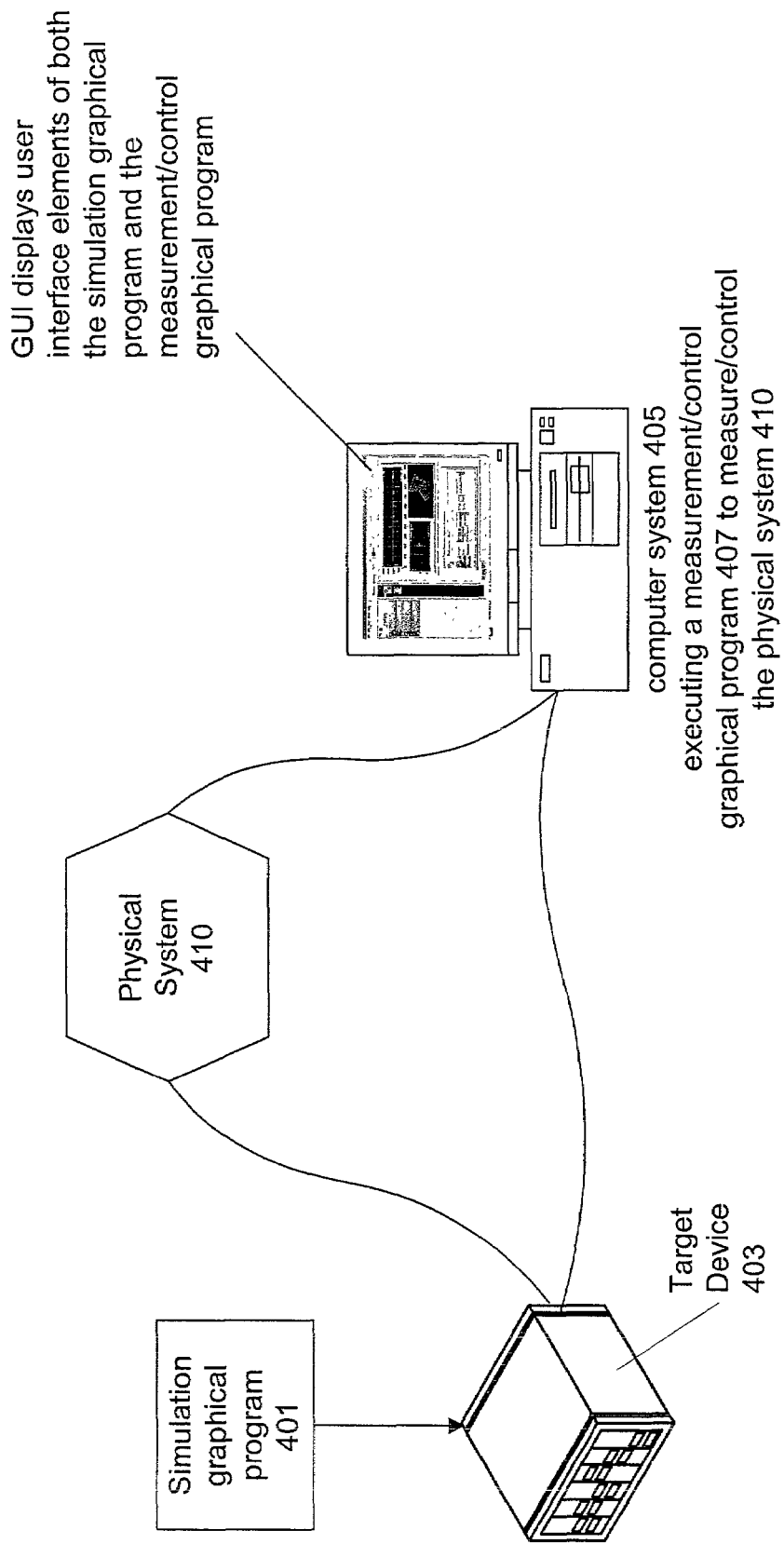
FIG. 11 illustrates another embodiment of a system for performing rapid control prototyping, in which two graphical programs share a single graphical user interface.

FIG. 11 illustrates another embodiment of a system for performing rapid control prototyping. As shown, a simulation graphical program 401 may be deployed on a target device 403, similarly as in FIG. 9. For example, the simulation graphical program may implement a control algorithm under test. The target device 403 may again be coupled to a physical system 410. In this embodiment, the computer system 405 may be coupled to the physical system 410. The computer system 405 may execute a measurement/control graphical program 407 to measure and/or control the physical system 410. In another embodiment, the measurement/control graphical program 407 may also measure and/or control the target device 403.

Similarly as described above with reference to FIG. 9, the simulation graphical program 401 may have a first one or more associated user interface elements, and the measurement/control graphical program 407 may have a second one or more associated user interface elements. It may be desirable to display a single graphical user interface that comprises both the first one or more and the second one or more user interface elements. In one embodiment, the single graphical user interface may be displayed on a display screen of the computer system 405. Thus, the computer system 405 may be coupled to the target device 403, in addition to being coupled to the physical system 410. In various other embodiments, the single graphical user interface may be displayed in various other locations, such as on a separate computer system that is coupled to both the computer system 405 and the target device 403.

Figure 12:
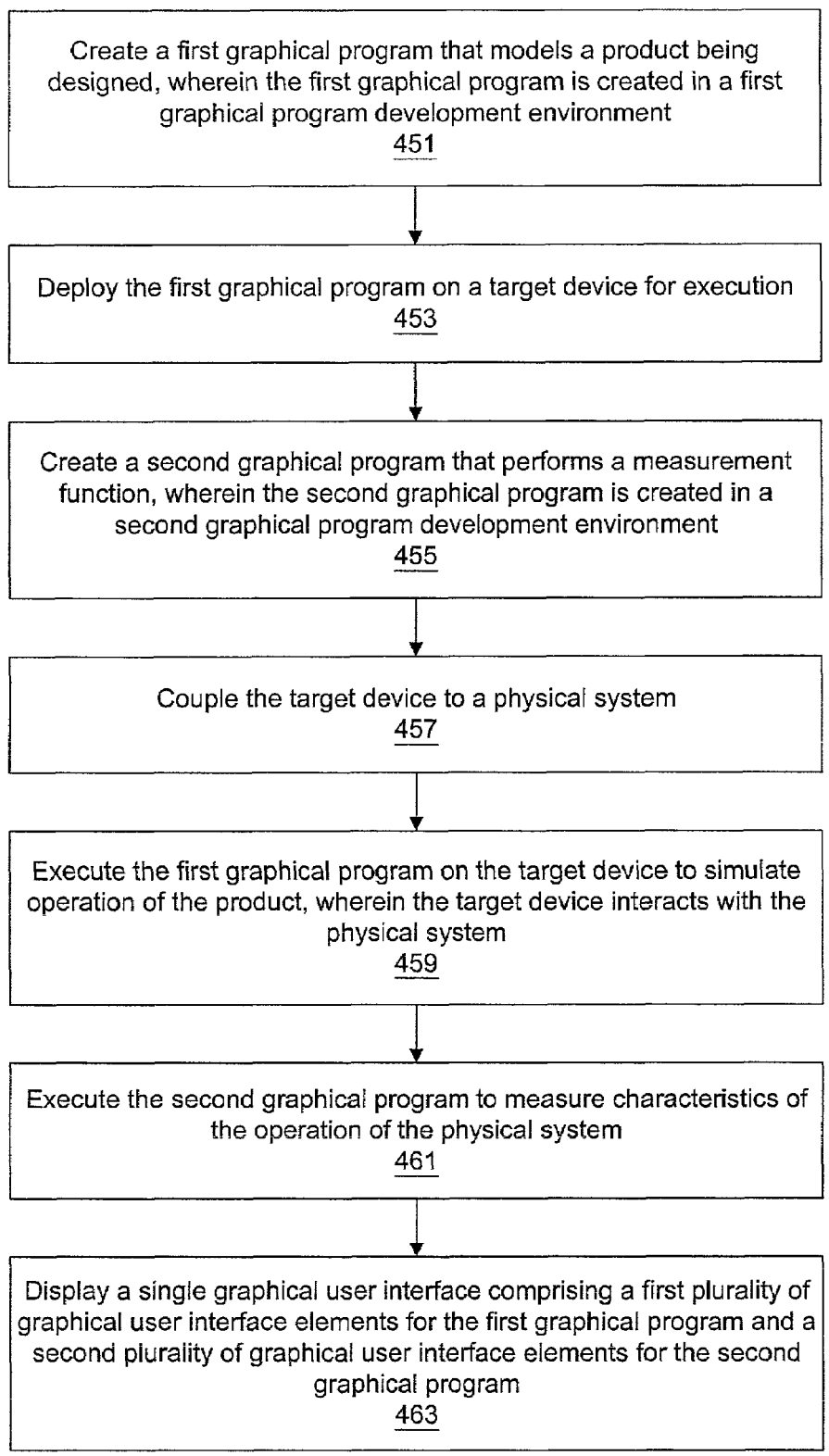
FIG. 12 is a flowchart diagram illustrating another embodiment of a method for performing a rapid control prototyping simulation, in which two graphical programs share a single graphical user interface.

FIG. 12 is a flowchart diagram illustrating one embodiment of a method for performing a rapid control prototyping simulation as described above with reference to FIG. 11. It is noted that various steps of FIG. 12 may be performed in different orders, steps may be combined, omitted, or altered, etc.

In step 451, a first graphical program may be created, wherein the first graphical program models a product being designed. The first graphical program may be created in a first graphical program development environment. Step 451 is similar to step 421 of FIG. 10.

In step 453, the first graphical program may be deployed on a target device for execution. Step 453 is similar to step 423 of FIG. 10.

In step 455, a second graphical program may be created, wherein the second graphical program performs a measurement function. The second graphical program may be created in a second graphical program development environment. Step 455 is similar to step 425 of FIG. 10.

In step 457, the target device may be coupled to a physical system. Step 457 is similar to step 427 of FIG. 10.

In step 459, the first graphical program may be executed on the target device to simulate operation of the product. During this execution, the target device may interact with the physical system, e.g., to control the physical system. Step 459 is similar to step 429 of FIG. 10.

In step 461, the second graphical program may be executed to measure characteristics of the operation of the physical system. As shown in FIG. 9, this may comprise executing the second graphical program on a computer system coupled to the physical system. For example, the second graphical program may be utilized to gather information from the physical system that can be analyzed to determine how well the target device is controlling the physical system.

In step 463, a single graphical user interface may be displayed, wherein the single graphical user interface comprises a first one or more graphical user interface elements for the first graphical program and a second one or more graphical user interface elements for the second graphical program. As described above, the single graphical user interface may be displayed in any of various locations, such as on a computer system that executes the second graphical program or on another computer system.

As described above with reference to FIG. 10, the first one or more graphical user interface elements for the first graphical program may include input and/or output GUI elements related to the modeling performed by the first graphical program. The second one or more graphical user interface elements for the second graphical program may include input and/or output GUI elements related to the performance of the physical system. For example, the second one or more graphical user interface elements may include GUI input elements which allow the user to change various aspects of the physical system, e.g., to determine how the target device behaves in response. The second one or more graphical user interface elements may also include GUI output elements which allow the user to view variables or aspects related to the operation of the physical system.

Another typical use of simulation is known as "hardware-in-the-loop" simulation. With hardware-in-the-loop simulation, a real product may be tested in conjunction with a simulated physical system. For example, consider a control unit designed to control a physical system. It may be impractical to test the control unit with the real physical system the control unit is designed to control. For example, the tests may be too expensive, too dangerous, or impossible, e.g., the real physical system may not exist yet. Thus, it may be desirable to couple the real control unit to a simulated physical system to perform the tests. The simulation of the physical system may execute on real-time hardware so that the simulation closely approximates the real system. As one example, consider a control unit designed to control an automobile. It may be desirable to test how the control unit responds in a crash situation. By performing a hardware-in-the-loop simulation, the crash situation can be simulated without actually crashing a real automobile.

In one embodiment of a system for performing a hardware-in-the-loop simulation, a measurement/control program may be utilized to measure characteristics of the real product being tested, e.g., a real control unit, and/or to control operation of the real product. For example, the measurement/control program may be utilized to gather information that can be analyzed to determine how well the real product under test is performing. Also, the measurement/control program may be utilized to change operation parameters of the real product, e.g., to determine how this affects the operation of product under test.

Figure 13:
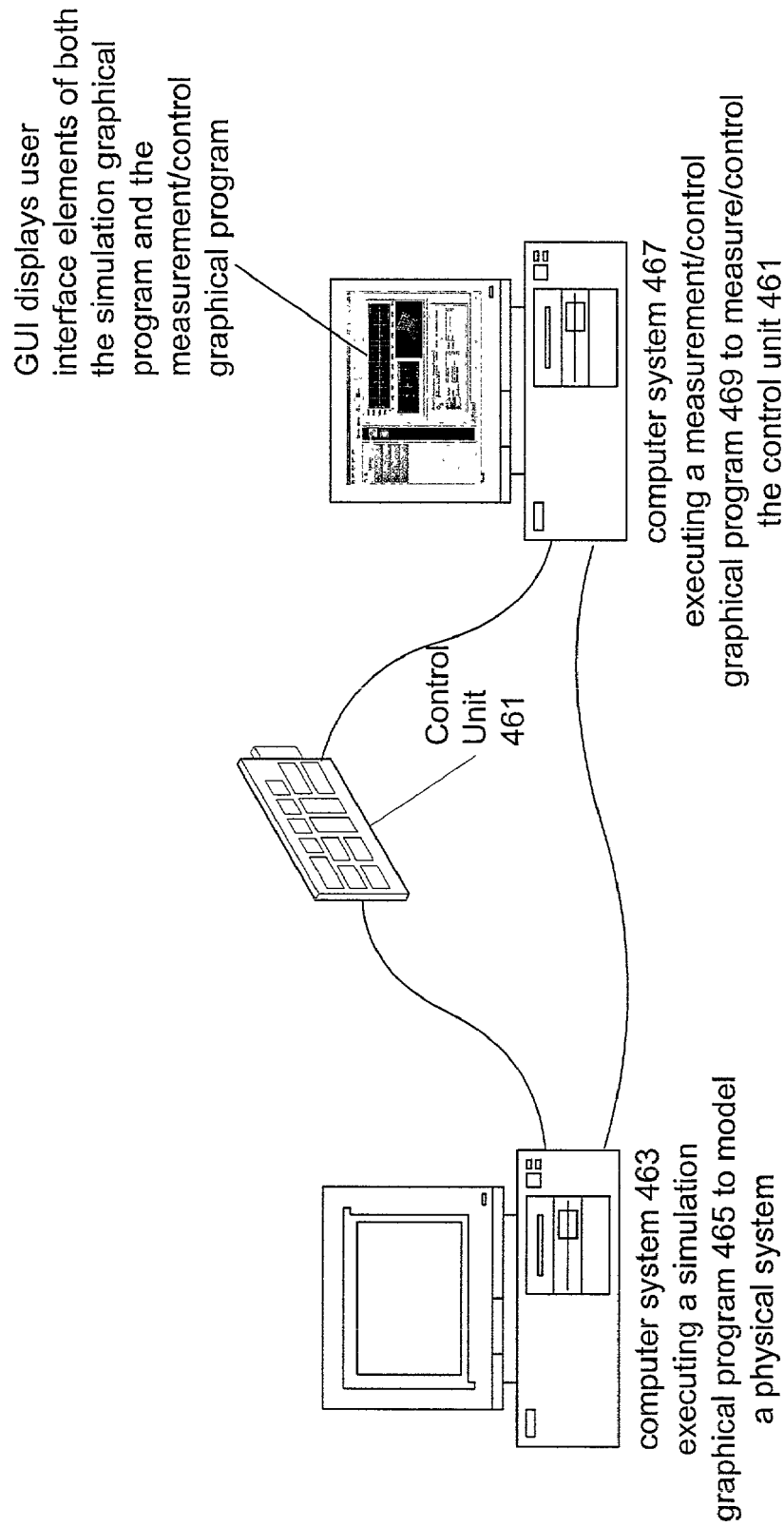
FIG. 13 illustrates one embodiment of a system for performing a hardware-in-the-loop simulation, in which two graphical programs share a single graphical user interface.

FIG. 13 illustrates one embodiment of a system for performing a hardware-in-the-loop simulation. As shown, a simulation graphical program 465 may be executed on a computer system 463. The simulation graphical program 465 may simulate operation of any of various types of physical systems, e.g., an automobile, a chemical process, a hydraulic system, etc. In various embodiments, the simulation graphical program 465 may execute on any of various types of computer system 463. For example, the computer system 463 may comprise a PC or workstation, a mainframe computer system, real-time hardware, or any combination of these and other types of computer systems.

The computer system 463 may be coupled to the real product under test, such as a real control unit 461. As shown, a computer system 467 may also be connected to the control unit 461, wherein the computer system 467 executes a measurement/control graphical program 469. The measurement/control graphical program 469 may interact with the control unit 461, e.g., to gather information to determine how well the control unit 461 is performing, and/or to control operation of the control unit 461. In another embodiment, the measurement/control graphical program 469 may execute on the same computer system as the simulation graphical program, i.e., the computer system 463.

The simulation graphical program 465 may have a first one or more associated user interface elements, and the measurement/control graphical program 469 may have a second one or more associated user interface elements. As described above, it may be desirable to display a single graphical user interface that comprises both the first one or more and the second one or more user interface elements. In one embodiment, the single graphical user interface may be displayed on a display screen of the computer system 467, as shown in FIG. 13. In various other embodiments, the single graphical user interface may be displayed in various other locations, such as on the computer system 463 or on a separate computer system that is coupled to both the computer system 463 and the computer system 467.

Figure 14:
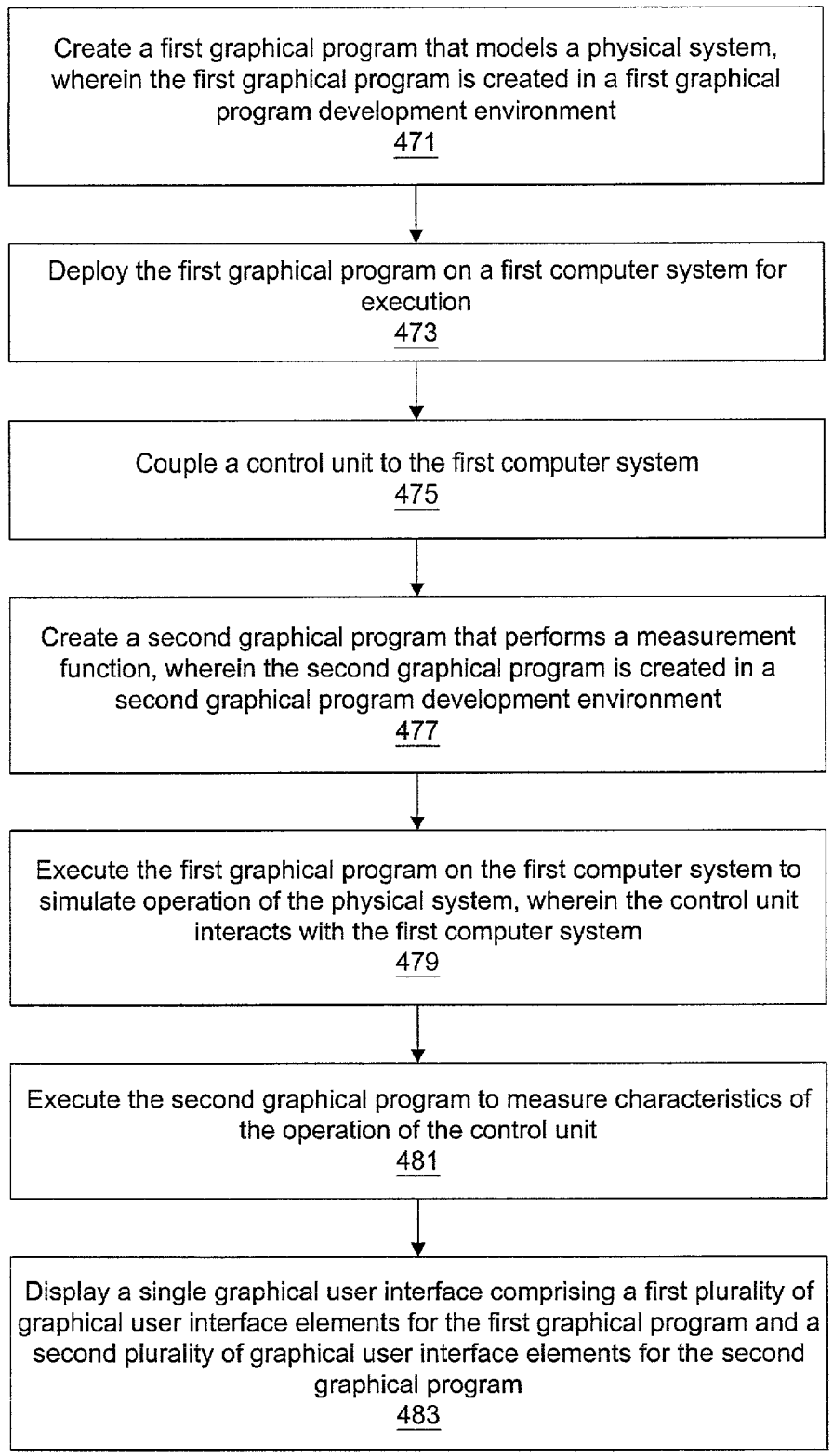
FIG. 14 is a flowchart diagram illustrating one embodiment of a method for performing a hardware-in-the-loop, in which two graphical programs share a single graphical user interface.

FIG. 14 is a flowchart diagram illustrating one embodiment of a method for performing a hardware-in-the-loop simulation as described above. It is noted that various steps of FIG. 12 may be performed in different orders, steps may be combined, omitted, or altered, etc.

In step 471, a first graphical program may be created, wherein the first graphical program models a physical system. The first graphical program may be created in a first graphical program development environment. For example, it may be desirable to create the first graphical program using a first graphical program development environment specialized for creating simulation programs.

In step 473, the first graphical program may be deployed on a first computer system for execution. The first graphical program may be deployed on any of various types of computer systems. In one embodiment, the first computer system may comprise real-time hardware, such as an FPGA or DSP. Similarly as described above, in various embodiments, any of various methods may be used to deploy the first graphical program on the first computer system.

In step 475, a control unit may be coupled to the first computer system. For example, the control unit may be designed to control operation of the real physical system which is simulated by the first graphical program deployed on the first computer system. In various embodiments, the control unit may be coupled to the first computer system in any of various ways. For example, the control unit may include various input/output ports that connect to input/output ports of the first computer system (or input/output ports of devices connected to the first computer system). In some cases, intermediate devices may be connected between the target device and the physical system, such as actuators that control the system and/or sensors that provide feedback to the target device.

In step 477, a second graphical program may be created, wherein the second graphical program performs a measurement function. For example, the second graphical program may be designed to gather information from the control unit, e.g., to determine how well the control unit is performing. The second graphical program may be created in a second graphical program development environment. For example, it may be desirable to create the second graphical program using a second graphical program development environment specialized for creating measurement programs.

In step 479, the first graphical program may be executed on the first computer system to simulate operation of the physical system, wherein the control unit interacts with the first computer system. The control unit may operate normally, as if the control unit were controlling a real physical system.

In step 481, the second graphical program may be executed to measure characteristics of the operation of the control unit. The second graphical program may be executed in various locations, such as on the first computer system executing the first graphical program or on a separate computer system.

In step 483, a single graphical user interface may be displayed, wherein the single graphical user interface comprises a first one or more graphical user interface elements for the first graphical program and a second one or more graphical user interface elements for the second graphical program. The single graphical user interface may be displayed in any of various locations, such as on the computer system that executes the first graphical program, the computer system that executes the second graphical program, and/or on another computer system. Step 483 is similar to step 433, described above.

The first one or more graphical user interface elements for the first graphical program may include input and/or output GUI elements related to the simulation of the real physical system. For example, the second one or more graphical user interface elements may include GUI input elements which allow the user to change various aspects of the physical system simulation, e.g., to determine how the control unit behaves in response. The second one or more graphical user interface elements may also output GUI output elements which allow the user to view variables or aspects related to the operation of the physical system simulation.

The second one or more graphical user interface elements for the second graphical program may include input and/or output GUI elements related to the performance of the control unit. For example, the second one or more graphical user interface elements may include GUI input elements which allow the user to change various parameters or hardware settings of the control unit. The second one or more graphical user interface elements may also include GUI output elements which allow the user to view variables or aspects related to the operation of the control unit.

It may also be desirable to perform a pure software simulation of both a control unit and its environment. Thus, in another embodiment, one graphical program may simulate a real product, and another graphical program may simulate a real physical system, i.e., the environment in which the real product is intended to operate.

As one example, consider an automobile wheel traction control unit under development. A first graphical program, referred to herein as the simulation program, may be written to simulate the wheel traction control unit, and a second graphical program, referred to herein as the measurement program, may be written to simulate the environment in which the wheel traction control unit operates, i.e., the automobile. For example, the measurement program may provide simulated input values to the wheel traction control unit simulation program, such as the current amount of fuel input to the engine, an amount of braking currently applied by the automobile's driver, a current amount of slip for each wheel, etc. In response to these input values, the wheel traction control unit simulation program may produce various output values affecting the simulated automobile's wheels. The measurement program may receive these output values as feedback and compute new simulated input values to pass back to the wheel traction control unit simulation program.

Thus, the two programs may operate together, providing feedback to each other to simulate how an actual wheel traction control unit would respond under real world conditions. (The designation of one of the graphical programs as the "simulation" program and the other as the "measurement" program is somewhat arbitrary, since both programs may have both simulation and measurement aspects.)

According to one embodiment, the simulation and measurement programs may be written as two separate graphical programs, and the graphical programs may share a single graphical user interface. As one example, the simulation program may be a Simulink graphical program, and the measurement program may be a LabVIEW graphical program. The single graphical user interface may include a first subset of GUI elements for the measurement program and a second subset of GUI elements for the simulation program. For example, the first subset of GUI elements may include GUI controls for receiving user input values specifying variables of the automobile, such as the current fuel input to the engine, current amount of braking applied, etc. Also, the first subset of GUI elements may include GUI indicators for displaying variables of the automobile, such as the current speed, current amount of slip for each wheel, etc.

The second subset of GUI elements may include GUI controls for receiving user input values affecting certain internal variables used by the wheel traction control unit in computing traction control output values. The second subset of GUI elements may also include GUI indicators for displaying various internal values produced by the wheel traction control unit.

Thus, the user may interact with the GUI controls on the single graphical user interface to determine optimal internal variable values for use in the wheel traction control unit under various environmental conditions. Although the wheel traction simulation is implemented by two separate graphical programs, the single graphical user interface may appear to the user as one seamless application. program on a hardware device may help to more closely approximate how an actual wheel traction control unit would operate.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for simulating a product being designed, the method comprising:

creating a first graphical program that models the product being designed, wherein the first graphical program is created in a first graphical program development environment;

deploying the first graphical program on a target device for execution;

creating a second graphical program that performs a measurement function, wherein the second graphical program is created in a second graphical program development environment, wherein the second graphical program development environment is different than the first graphical program development environment;

coupling the target device to a physical system;
executing the first graphical program on the target device to simulate operation of the product, wherein the target device interacts with the physical system;
executing the second graphical program concurrently with the first graphical program to measure at least one of: 1) characteristics of the operation of the physical system and/or 2) characteristics of the operation of the product; and
displaying a single graphical user interface comprising a first one or more graphical user interface elements for the first graphical program and a second one or more graphical user interface elements for the second graphical program.

2. The method of claim 1,
wherein the first one or more graphical user interface elements for the first graphical program display one or more parameters related to operation of the first graphical program.

3. The method of claim 2,
wherein the first graphical program comprises a model of the product being designed;
wherein the one or more parameters affect operation of the model of the product being designed.

4. The method of claim 3, further comprising:
receiving user input to one of the first one or more graphical user interface elements to adjust operation of the first graphical program during said executing the first graphical program;
wherein the user input operates to adjust the model of the product being designed.

5. The method of claim 1,
wherein the second one or more graphical user interface elements for the second graphical program display measured characteristics relating to at least one of: 1) operation of the physical system and/or 2) operation of the target device.

6. The method of claim 1, further comprising:
receiving user input to one of the second one or more graphical user interface elements to adjust operation of the measurement function during said executing the second graphical program.

7. The method of claim 1, further comprising:
coupling a first computer system to the target device;
wherein said executing the second graphical program comprises executing the second graphical program on the first computer system;
wherein said executing the second graphical program to measure characteristics of the operation of the product comprises executing the second graphical program to measure characteristics of the target device.

8. The method of claim 7, further comprising:
displaying the single graphical user interface on a display screen of the first computer system.

9. The method of claim 1, further comprising:
coupling a first computer system to the physical system;
wherein said executing the second graphical program comprises executing the second graphical program on the first computer system;
wherein the second graphical program is executable to cause the first computer system to interface with the physical system through one or more instruments to measure characteristics of the physical system.

10. The method of claim 9, further comprising:
displaying the single graphical user interface on a display screen of the first computer system.

11. The method of claim 1,
wherein said deploying the first graphical program on a target device for execution comprises transferring the first graphical program from a first computer system to the target device;
wherein the target device is a board comprised in a slot of the first computer system.

12. The method of claim 1,
wherein said deploying the first graphical program on a target device for execution comprises transferring the first graphical program from a first computer system to the target device;
wherein the target device is external to the first computer system.

13. The method of claim 1,
wherein said deploying the first graphical program on the target device comprises storing the first graphical program in a memory of the target device.

14. The method of claim 13,
wherein the memory of the target device stores a graphical program execution engine for executing graphical programs created in the first graphical program development environment;
wherein said executing the first graphical program includes executing the graphical program execution engine.

15. The method of claim 1,
wherein said deploying the first graphical program on the target device comprises:
converting the first graphical program to machine language code; and
storing the machine language code in a memory of the target device.

16. The method of claim 1,
wherein said deploying the first graphical program on the target device comprises:
converting the first graphical program to a program in a text-based programming language;
compiling the program in the text-based programming language to machine language code; and
storing the machine language code in a memory of the target device.

17. The method of claim 1,
wherein the target device includes a programmable hardware element;
wherein said deploying the first graphical program on the target device comprises:
converting the first graphical program to a hardware configuration program; and
configuring the programmable hardware element on the target device according to the hardware configuration program.

18. The method of claim 1,
wherein said target device interacting with the physical system comprises the target device controlling the physical system.

19. The method of claim 1,
wherein said coupling the target device to the physical system comprises coupling the target device to one or more actuators coupled to the physical system;
wherein the first graphical program is executable to cause the target device to control the physical system through the one or more actuators.

20. The method of claim 1, further comprising:
assembling the first one or more graphical user interface elements and the second one or more graphical user interface elements on a display in response to user input.

21. The method of claim 1, further comprising:
assembling the first one or more graphical user interface elements and the second one or more graphical user interface elements on a single window of a display in response to user input.

22. The method of claim 1,
wherein the first one or more graphical user interface elements are selected from the first graphical program development environment; and
wherein the second one or more graphical user interface elements are selected from the second graphical program development environment.

23. The method of claim 1,
wherein the first one or more graphical user interface elements and the second one or more graphical user interface elements are selected from the second graphical program development environment.

24. The method of claim 1,
wherein the first one or more graphical user interface elements and the second one or more graphical user interface elements are selected from the first graphical program development environment.

25. The method of claim 1, further comprising:
creating the single graphical user interface in response to user input, wherein said creating includes selecting the first one or more graphical user interface elements from the first graphical program development environment and selecting the second one or more graphical user interface elements from the second graphical program development environment.

26. The method of claim 1, further comprising:
selecting the first one or more graphical user interface elements from the first graphical program development environment;
creating the single graphical user interface in the second graphical program development environment, wherein said creating comprises including the first one or more graphical user interface elements selected from the first graphical program development environment in the single graphical user interface.

27. The method of claim 26,
wherein said creating the single graphical user interface in the second graphical program development environment includes selecting the second one or more graphical user interface elements from the second graphical program development environment.

28. The method of claim 1,
wherein the single graphical user interface comprises a single window containing the first one or more graphical user interface elements and the second one or more graphical user interface elements.

29. The method of claim 1,
wherein the single graphical user interface comprises a single front panel containing the first one or more graphical user interface elements and the second one or more graphical user interface elements.

30. The method of claim 1,
wherein the first one or more graphical user interface elements comprise:
one or more graphical user interface elements for receiving user input and providing the user input to the first graphical program; and
one or more graphical user interface elements for displaying output from the first graphical program.

31. The method of claim 1,
wherein the second one or more graphical user interface elements comprise:
one or more graphical user interface elements for receiving user input and providing the user input to the second graphical program; and
one or more graphical user interface elements for displaying output from the second graphical program.

32. The method of claim 1,
wherein said executing the second graphical program comprises executing the second graphical program to measure characteristics of the operation of the physical system;
wherein the measured characteristics of the operation of the physical system are useful in analyzing operation of the product.

33. The method of claim 1,
wherein said executing the second graphical program comprises executing the second graphical program to measure characteristics of the operation of the product;
wherein the measured characteristics of the operation of the product are useful in analyzing operation of the product.

34. The method of claim 1,
wherein the first graphical program comprises a plurality of interconnected nodes which visually indicate functionality of the first graphical program.

35. The method of claim 1,
wherein the second graphical program comprises a plurality of interconnected nodes which visually indicate functionality of the second graphical program.

36. The method of claim 1,
wherein the first graphical program comprises a block diagram.

37. The method of claim 1,
wherein the second graphical program comprises a block diagram.

38. The method of claim 1,
wherein the first graphical program comprises one of a data flow diagram or a control flow diagram; and
wherein the second graphical program comprises one of a data flow diagram or a control flow diagram.

39. The method of claim 1,
wherein the first graphical program comprises one of a data flow diagram and/or a state transition diagram;
wherein the second graphical program comprises a data flow diagram.

40. The method of claim 1,
wherein the first graphical program comprises a Simulink diagram.

41. The method of claim 1,
wherein the second graphical program comprises a LabVIEW diagram.

42. The method of claim 1,
wherein the method performs a rapid control prototyping simulation.

43. The method of claim 1,
wherein the product being designed comprises a control unit for controlling the physical system.

44. The method of claim 43,
wherein the second graphical program is operable to measure characteristics of the operation of the physical system;

wherein the measured characteristics of the operation of the physical system are useful in analyzing control of the physical system.

45. A system for simulating a product being designed, the system comprising:

a physical system;

a target device coupled to the physical system, wherein the target device is configured to execute a first graphical program that models a product being designed, wherein the first graphical program was created in a first graphical program development environment;

a first computer system coupled to the target device, wherein the first computer system is configured to execute a second graphical program that performs a measurement function, wherein the second graphical program was created in a second graphical program development environment, wherein the second graphical program development environment is different than the first graphical program development environment;

wherein the target device is operable to execute the first graphical program to simulate operation of the product, wherein the first graphical program causes the target device to interact with the physical system;

wherein the first computer system is operable to execute the second graphical program concurrently with the first graphical program to measure at least one of: 1) characteristics of the operation of the physical system and/or 2) characteristics of the operation of the product; and wherein the first computer system is operable to display a single graphical user interface comprising a first one or more graphical user interface elements for the first graphical program and a second one or more graphical user interface elements for the second graphical program.

46. The system of claim 45,
wherein said target device interacting with the physical system comprises the target device controlling the physical system.

47. The system of claim 45,
wherein the first one or more graphical user interface elements for the first graphical program display one or more parameters related to operation of the first graphical program;
wherein the first graphical program comprises a model of the product being designed;
wherein the one or more parameters affect operation of the model of the product being designed;
wherein the system further comprises a user input device for receiving user input to one of the first one or more graphical user interface elements to adjust operation of the first graphical program;
wherein the user input operates to adjust the model of the product being designed.

48. The system of claim 45,
wherein the second one or more graphical user interface elements for the second graphical program display measured characteristics relating to operation of the target device;
the system further comprising:
a user input device for receiving user input to one of the second one or more graphical user interface elements to adjust operation of the measurement function.

49. The system of claim 45,
wherein the target device includes a processor and memory;

wherein the memory of the target device stores the first graphical program;
wherein the memory of the target device also stores a graphical program execution engine for executing graphical programs created in the first graphical program development environment;
wherein the processor in the target device is operable to execute the graphical program execution engine in executing the first graphical program.

50. The system of claim 45,
wherein the target device includes a processor and memory;
wherein the memory of the target device stores executable code created from the first graphical program; and
wherein the processor in the target device is operable to execute the executable code.

51. The system of claim 45,
wherein the target device includes a programmable hardware element;
wherein the programmable hardware element is configured with a hardware configuration program based on the first graphical program.

52. The system of claim 45,
wherein the single graphical user interface comprises a single window containing the first one or more graphical user interface elements and the second one or more graphical user interface elements.

53. The system of claim 45,
wherein the first computer system is operable to execute the second graphical program to measure characteristics of the operation of the physical system;
wherein the measured characteristics of the operation of the physical system are useful in analyzing operation of the product.

54. The system of claim 45,
wherein the first computer system is operable to execute the second graphical program to measure characteristics of the operation of the product;
wherein the measured characteristics of the operation of the product are useful in analyzing operation of the product.

55. The system of claim 45,
wherein the first graphical program comprises a plurality of interconnected nodes which visually indicate functionality of the first graphical program.

56. The system of claim 45,
wherein the second graphical program comprises a plurality of interconnected nodes which visually indicate functionality of the second graphical program.

57. The system of claim 45,
wherein the first graphical program comprises a data flow diagram; and
wherein the second graphical program comprises one of a data flow diagram or a control flow diagram.

58. The system of claim 45,
wherein the system performs a rapid control prototyping simulation.

59. A method for simulating a product being designed, the method comprising:
creating a first graphical program that models the product being designed, wherein the first graphical program is created in a first graphical program development environment;
deploying the first graphical program on a target device for execution;
creating a second graphical program that performs a measurement function, wherein the second graphical program is created in a second graphical program development environment, wherein the second graphical program development environment is different than the first graphical program development environment;

coupling the target device to a physical system;

executing the first graphical program on the target device to simulate operation of the product, wherein the target device interacts with the physical system;

executing the second graphical program concurrently with the first graphical program to measure characteristics of the operation of the physical system; and displaying a single graphical user interface window comprising a first one or more graphical user interface elements for the first graphical program and a second one or more graphical user interface elements for the second graphical program.

60. A method for simulating a product being designed, the method comprising:

creating a first graphical program that models the product being designed, wherein the first graphical program is created in a first graphical program development environment;

deploying the first graphical program on a target device for execution;

creating a second graphical program that performs a measurement function, wherein the second graphical program is created in a second graphical program development environment, wherein the second graphical program development environment is different than the first graphical program development environment;

coupling the target device to a physical system;

executing the first graphical program on the target device to simulate operation of the product, wherein the target device interacts with the physical system;

executing the second graphical program concurrently with the first graphical program to measure characteristics of the operation of the target device; and displaying a single graphical user interface window comprising a first one or more graphical user interface elements for the first graphical program and a second one or more graphical user interface elements for the second graphical program.

61. A method for performing a rapid control prototyping simulation, the method comprising:

creating a first graphical program that models a product being designed, wherein the first graphical program is created in a first graphical program development environment;

deploying the first graphical program on a target device for execution;

creating a second graphical program that performs a measurement function, wherein the second graphical program is created in a second graphical program development environment, wherein the second graphical program development environment is different than the first graphical program development environment;

coupling the target device to a physical system;

executing the first graphical program on the target device to simulate operation of the product, wherein the target device interacts with the physical system;

executing the second graphical program concurrently with the first graphical program to measure characteristics of the operation of the physical system; and displaying a single graphical user interface comprising a first plurality of graphical user interface elements for the first graphical program and a second plurality of graphical user interface elements for the second graphical program.

62. The method of claim 61, wherein the second plurality of graphical user interface elements for the second graphical program display measured characteristics relating to operation of the physical system.

63. The method of claim 61, further comprising:

coupling one or more sensors to the physical system, wherein the sensors are operable to receive signals from the physical system and provide the received signals to the second graphical program.

64. The method of claim 61, further comprising:

coupling a first computer system to the physical system; and executing the second graphical program on the first computer system.

65. A system for performing a rapid control prototyping simulation, the system comprising:

a physical system;

a target device coupled to the physical system, wherein the target device is configured to execute a first graphical program that models a product being designed, wherein the first graphical program was created in a first graphical program development environment;

a first computer system coupled to the physical system, wherein the first computer system is configured to execute a second graphical program that performs a measurement function, wherein the second graphical program was created in a second graphical program development environment, wherein the second graphical program development environment is different than the first graphical program development environment;

wherein the target device is operable to execute the first graphical program to simulate operation of the product, wherein the first graphical program causes the target device to interact with the physical system;

wherein the first computer system is operable to execute the second graphical program concurrently with the first graphical program to measure characteristics of the operation of the physical system; and wherein the first computer system is operable to display a single graphical user interface comprising a first plurality of graphical user interface elements for the first graphical program and a second plurality of graphical user interface elements for the second graphical program.

66. The system of claim 65, wherein said target device interacting with the physical system comprises the target device controlling the physical system.

67. A method for evaluating operation of a control unit being designed, the method comprising:

creating a first graphical program that models the control unit being designed, wherein the first graphical program is created in a first graphical program development environment;

deploying the first graphical program on a target device for execution;

creating a second graphical program that performs a measurement function, wherein the second graphical program is created in a second graphical program development environment, wherein the second graphical program development environment is different than the first graphical program development environment;

coupling the target device to a physical system;

executing the first graphical program on the target device to simulate operation of the control unit, wherein the target device interacts with the physical system to control the physical system;

executing the second graphical program concurrently with the first graphical program to measure characteristics of the operation of the physical system, wherein the measured characteristics are useful in analyzing operation of the control unit; and displaying a single graphical user interface comprising a first one or more graphical user interface elements for the first graphical program and a second one or more graphical user interface elements for the second graphical program.

* * * * *